US010920044B2

(12) United States Patent
LaPray et al.

(10) Patent No.: US 10,920,044 B2
(45) Date of Patent: Feb. 16, 2021

(54) CARBOHYDRATE-BASED PLASTIC MATERIALS WITH REDUCED ODOR

(71) Applicant: BiologiQ, Inc., Idaho Falls, ID (US)

(72) Inventors: Bradford LaPray, Idaho Falls, ID (US); Donald R. Allen, Idaho Falls, ID (US)

(73) Assignee: BIOLOGIQ, INC., Idaho Falls, ID (US)

( * ) Notice: Subject to any disclaimer, the term of this patent is extended or adjusted under 35 U.S.C. 154(b) by 0 days.

(21) Appl. No.: 16/456,295

(22) Filed: Jun. 28, 2019

(65) Prior Publication Data

US 2019/0315942 A1    Oct. 17, 2019

Related U.S. Application Data

(63) Continuation-in-part of application No. PCT/US2017/068492, filed on Dec. 27, 2017, which is a continuation-in-part of application No. 15/481,806, filed on Apr. 7, 2017, and a continuation-in-part of application No. 15/481,823, filed on Apr. 7, 2017, and a continuation-in-part of application No. 15/691,588, filed on Aug. 30, 2017, and a continuation-in-part of application No. 15/836,555, filed on Dec. 8, 2017, application No. 16/456,295, filed on Jun. 28, 2019, which is a continuation-in-part of application No. 15/691,588, filed on Aug. 30, 2017, which is a continuation-in-part of application No. 14/853,725, filed on Sep. 14, 2015, now abandoned, said application No. 15/691,588 is a continuation-in-part of application No. 14/853,780, filed on Sep. 14, 2015, now abandoned, and a continuation-in-part of application No. 15/481,806, filed on Apr. 7, 2017, and a continuation-in-part of application No. 15/481,823, filed on Apr. 7, 2017.

(60) Provisional application No. 62/610,615, filed on Dec. 27, 2017, provisional application No. 62/610,618, filed on Dec. 27, 2017, provisional application No. 62/440,399, filed on Dec. 29, 2016, provisional application No. 62/442,432, filed on Jan. 4, 2017, provisional application No. 62/483,219, filed on Apr.

(Continued)

(51) Int. Cl.
| | |
|---|---|
| *C08J 7/04* | (2020.01) |
| *B32B 27/00* | (2006.01) |
| *A01K 1/015* | (2006.01) |
| *C08L 3/04* | (2006.01) |
| *C08J 3/00* | (2006.01) |
| *C08K 5/07* | (2006.01) |
| *C08L 23/08* | (2006.01) |
| *C08L 23/14* | (2006.01) |
| *C08L 55/02* | (2006.01) |
| *C08L 27/06* | (2006.01) |
| *C08L 25/08* | (2006.01) |

(52) U.S. Cl.
CPC ............... *C08L 3/04* (2013.01); *C08J 3/005* (2013.01); *C08K 5/07* (2013.01); *C08L 23/08* (2013.01); *C08L 23/14* (2013.01); *C08L 25/08* (2013.01); *C08L 27/06* (2013.01); *C08L 55/02* (2013.01); *C08K 2201/007* (2013.01); *C08L 2207/04* (2013.01)

(58) Field of Classification Search
CPC .......... C08L 23/06; C08L 23/08; C08L 23/14; C08L 25/08; C08L 55/02; C08L 3/04; C08L 3/02; C08L 27/06; C08L 2207/04; C08J 3/005; C08K 5/07; C08K 5/053; C08K 5/13; C08K 2201/007
USPC ......................................... 428/341, 340, 221
See application file for complete search history.

(56) References Cited

U.S. PATENT DOCUMENTS

| | | |
|---|---|---|
| 3,270,874 A | 9/1966 | Hilton |
| 3,865,603 A | 2/1975 | Szymanski |

(Continued)

FOREIGN PATENT DOCUMENTS

| | | |
|---|---|---|
| CA | 1031088 | 5/1978 |
| CN | 1603361 | 4/2005 |

(Continued)

OTHER PUBLICATIONS

Droge et al, WO 2016/134994 Machine Translation, Sep. 1, 2016 (Year: 2016).*

(Continued)

*Primary Examiner* — Jessica Whiteley

(57) ABSTRACT

Sustainable thermoplastic carbohydrate-based polymeric materials, and sustainable plastic materials including an organic odor-reducing agent to counteract a slight burned carbohydrate odor resulting from inclusion of a carbohydrate-based polymeric material within the described materials. Such carbohydrate-based polymeric material may be starch-based, and the slight characteristic odor lent by such material may be that of a somewhat burned starch, such as a popcorn or caramel corn type odor. Applicant has found that this slight odor can be substantially removed by addition of a very small fraction of particular organic materials. 4-hydroxy-3-methoxybenzaldehyde (vanillin) has been found to be particularly effective, even in very small concentrations. Other freeze-dried fruit extracts (e.g., strawberry, raspberry, blueberry, etc.) may similarly be used. As little as 20 ppm of the organic odor-reducing agent is sufficient to substantially remove the characteristic burned starch odor. A ratio of the odor-reducing agent to the carbohydrate-based polymer may be less than 1:1000.

20 Claims, 4 Drawing Sheets

Related U.S. Application Data 7, 2017, provisional application No. 62/187,231, filed on Jun. 30, 2015.

(56) References Cited

U.S. PATENT DOCUMENTS

| | | | |
|---|---|---|---|
| 4,016,117 | A | 4/1977 | Griffin |
| 5,026,745 | A | 6/1991 | Weil |
| 5,095,054 | A | 3/1992 | Lay et al. |
| 5,314,934 | A | 5/1994 | Tomka |
| 5,449,708 | A | 9/1995 | Schiltz |
| 5,462,983 | A | 10/1995 | Bloembergen |
| 5,510,401 | A | 4/1996 | Dehennau et al. |
| 5,714,445 | A | 2/1998 | Trinh |
| 6,211,325 | B1 | 4/2001 | Sun |
| 6,605,657 | B1 | 8/2003 | Favis et al. |
| 6,783,854 | B2 | 8/2004 | Bond |
| 6,818,295 | B2 | 11/2004 | Bond et al. |
| 6,946,506 | B2 | 9/2005 | Bond et al. |
| 7,608,649 | B2 | 10/2009 | Sun |
| 7,666,261 | B2 | 2/2010 | Bailey et al. |
| 7,740,952 | B2 | 6/2010 | Hausmann |
| 7,998,888 | B2 | 8/2011 | Shi |
| 8,188,185 | B2 | 5/2012 | Wang |
| 8,283,006 | B2 | 10/2012 | Wang |
| 8,329,601 | B2 | 12/2012 | Shi |
| 8,466,337 | B2 | 6/2013 | Wang |
| 8,802,754 | B2 | 8/2014 | Nie |
| 8,889,945 | B2 | 11/2014 | Wang |
| 8,927,617 | B2 | 1/2015 | Funk |
| 9,056,968 | B2 | 6/2015 | Matsuo et al. |
| 9,327,438 | B2 | 5/2016 | Wang |
| 9,464,188 | B2 | 10/2016 | Wang |
| 9,884,471 | B2 | 2/2018 | Neuman et al. |
| 10,131,783 | B2 | 11/2018 | Schmidt et al. |
| 10,214,634 | B2 | 2/2019 | LaPray |
| 10,239,292 | B2 | 3/2019 | Nissenbaum et al. |
| 2002/0006989 | A1 | 1/2002 | Bastioli |
| 2002/0168517 | A1 | 11/2002 | Husemann et al. |
| 2002/0168518 | A1 | 11/2002 | Bond et al. |
| 2002/0188041 | A1 | 12/2002 | Bond et al. |
| 2003/0077444 | A1 | 4/2003 | Bond et al. |
| 2003/0166779 | A1 | 9/2003 | Khemani |
| 2008/0103232 | A1 | 5/2008 | Lake |
| 2008/0287592 | A1 | 11/2008 | Favis |
| 2009/0048368 | A1 | 2/2009 | Bash |
| 2010/0159777 | A1 | 6/2010 | Wang |
| 2010/0311874 | A1 | 12/2010 | Mentink |
| 2011/0287929 | A1 | 11/2011 | Smith |
| 2012/0059097 | A1 | 3/2012 | Liao |
| 2012/0139154 | A1 | 6/2012 | Huneault |
| 2012/0283364 | A1 | 11/2012 | Sarazin et al. |
| 2012/0316257 | A1 | 12/2012 | Bastioli |
| 2013/0157031 | A1 | 6/2013 | Wang |
| 2013/0157032 | A1 | 6/2013 | Wang |
| 2014/0011921 | A1 | 1/2014 | Bash |
| 2014/0079935 | A1 | 3/2014 | Broyles |
| 2014/0272370 | A1 | 9/2014 | Broyles |
| 2016/0107426 | A1 | 4/2016 | Leufgens |
| 2017/0210889 | A1 | 7/2017 | LaPray |
| 2017/0218184 | A1 | 8/2017 | LaPray |
| 2017/0283597 | A1 | 10/2017 | LaPray et al. |
| 2017/0362418 | A1 | 12/2017 | LaPray |
| 2018/0100060 | A1 | 4/2018 | LaPray |
| 2019/0194426 | A1 | 2/2019 | LaPray |
| 2019/0256681 | A1 | 8/2019 | LaPray |
| 2019/0276664 | A1 | 9/2019 | LaPray |
| 2019/0315947 | A1 | 10/2019 | LaPray |

FOREIGN PATENT DOCUMENTS

| | | |
|---|---|---|
| CN | 101589097 | 11/2009 |
| CN | 101805499 B | 5/2012 |
| CN | 102850626 | 1/2013 |
| CN | 103289165 | 9/2013 |
| CN | 103987504 | 8/2014 |
| CN | 103998195 | 8/2014 |
| CN | 105966014 | 9/2016 |
| CN | 103627153 | 2/2018 |
| CN | 103627153 B | 2/2018 |
| CN | 107793619 | * 3/2018 |
| CN | 105670239 B | 6/2018 |
| CN | 108276744 | 7/2018 |
| EP | 326517 | 7/1994 |
| EP | 2762307 | 8/2014 |
| GB | 2272699 | 5/1994 |
| JP | S49055740 | 5/1974 |
| JP | S50086543 | 7/1975 |
| JP | H07126449 | 5/1995 |
| JP | H07258488 | 10/1995 |
| JP | H09041224 | 2/1997 |
| JP | H11322962 | 11/1999 |
| JP | 2003518541 | 6/2003 |
| JP | 3539955 | 7/2004 |
| JP | 2005089718 | 4/2005 |
| JP | 2005264111 | 9/2005 |
| JP | 2010150305 | 7/2010 |
| JP | 2010260923 | 11/2010 |
| JP | 2011042032 | 3/2011 |
| JP | 2011511121 | 4/2011 |
| JP | 2011213836 | 10/2011 |
| JP | 2012148507 | 8/2012 |
| JP | 5544303 | 7/2014 |
| JP | 2018502744 | 2/2018 |
| JP | 2018525467 | 9/2018 |
| TW | 201538529 | 10/2015 |
| WO | 148078 | 7/2001 |
| WO | 2003014164 | 11/2004 |
| WO | 2006116861 | 11/2006 |
| WO | 2009073197 | 6/2009 |
| WO | 2009103052 | 8/2009 |
| WO | 2011020170 | 2/2011 |
| WO | 2012088585 | 7/2012 |
| WO | 2013116945 | 8/2013 |
| WO | 2014089321 | 6/2014 |
| WO | 2014190395 | 12/2014 |
| WO | 2015028943 | 3/2015 |
| WO | 2016109196 | 7/2016 |
| WO | WO-2016134994 A1 | * 9/2016 ............. A61K 8/044 |
| WO | 2018187784 | 10/2018 |

OTHER PUBLICATIONS

Ming et al, CN107793619 Machine Translation, Mar. 13, 2018 (Year: 2018).*
U.S. Appl. No. 15/836,555, Jul. 14, 2020, Office Action.
Santos, R. A. L. et al. "Starch/Poly 9 Butylene Adipate-Co Terephthlalate/ Montmorillonite Films Produced By Blow Extrusion".
U.S. Appl. No. 15/481,823, Jul. 12, 2019, Final Office Action.
U.S. Appl. No. 15/836,555, Feb. 7, 2020, Final Office Action.
U.S. Appl. No. 16/456,303, Apr. 9, 2020, Office Action.
PCT Search Report dated Sep. 14, 2016 for PCT/US2016/040092, 1 page.
PCT Search Report dated Sep. 15, 2016 for PCT/US2016/040104, 1 page.
Kalambur, et al., "An Overview of Starch-Based Plastic Blends from Reactive Extrusion" Journal of Plastic Film and Sheeting, 2006, vol. 22, pp. 39-58.
Wootthikanokkhan, et al., "Effect of Blending Conditions on Mechanical, Thermal, and Rheological Properties of Plasticized Poly(lactic acid)/Maleated Thermoplastic Starch Blends," Journal of Applied Polymer Science, 2012, vol. 124, pp. 1012-1019.
Tang, et al., "Recent Advances in Starch, Polyvinyl Alcohol Based Polymer Blends, Nanocomposites and their Biodegradability" Carbohydrate Polymers, 2011, vol. 85, pp. 7-16.
Turley "Coca-Cola Collaborates on Bio-PET Project" ChemistryWorld, Jun. 11, 2012, accessed Apr. 6, 2017 at https://www.chemistryworld. com/news/coca-cola-collaborates-on-bio-pet-project/5091.article, 2 pages.
Braskem "Life Cycle Assessment of Green Plastic" Available as early as Mar. 28, 2017, accessed at http://www.braskem.com_site. aspx_plastic-green, 18 pages.

(56) References Cited

OTHER PUBLICATIONS

De Guzman "Coca-Cola produces 100% Bio-Based PET Bottle" Green Chemicals Blog, Jun. 9, 2015, 3 pages, accessed on Mar. 28, 2017 at https://greenchemicalsblog.com/2015/06/09/coca-cola-produces-100-bio-based-pet-bottle/ 3 pages.
Ojeda, Telmo, et al., "Polymer Degradation and Stability" Available as early as Dec. 16, 2010 at www.elsevier.com/locat/polydegstab, 5 pages.
Thakore, I.M., et al., "Studies on Biodegradability, morphology and thermo-mechanical properties of LDPE/modified starch blends" published in *The European Polymer Journal*, vol. 37 2001, pp. 151-160.
Vargha, et al., "Behavior of Polyethylene Films in Soil" published in Periodica Polytechnica Chemical Engineering, Nov. 5, 2015 pp. 60-68.
Li, Gang, et al., "Biodegradation of Thermoplastic Starch and its Blends with Poly(lactic acid) and Polyethylene: Influence of Morphology" published in Macromolecular Journals of Chemistry and Physics, 2011 pp. 1147-1154.
Ibbrucker, Constance "Can Additives make plastics biodegradable?" Bioplastics Magazine Jan. 2017, 1 page.
Ibbrucker, Constance "Oxo-degradable plastics increasingly under fire in Europe" European Bioplastics, http://www.european-bioplastics.org/oxo-degradable-plastics-increasingly-under-fire-in-europe/ Feb. 28, 2017, 5 pages.
"'Oxo-Biodegradable' Plastics and Other Plastics with Additives for Degradation" European Bioplastics BackGround Oct. 2015, 5 pages.
"BPI Position on Degradable Additives" Feb. 2010, 6 pages.
"The SPC Position Against Biodegradability Additives for Petroleum-Based Plastics" Sustainable Packaging Coalition, http://www.sustainablepackaging.org/content/?type=5&id=position-against-biodegradability-additives-for-petroleum-based-plastics Retreived on Sep. 19, 2017, 5 pages.
"APR Position Statement—Degradable Additives Use in Bottles, Forms and Films" The Association of Postconsumer Plastic Recyclers, http://plasticsrecycling.org/about/position-statements, Apr. 27, 2015, 1 page.
"Compostable Plastics 101: An Overview of Compostable Plastics Sponsored by the California Organics Recycling Council" based on information and belief, available at least as early as 2012, 23 pages.
Yoshida, et al., "A Bacterium that Degrades and Assimilates Poly(ehylene terphthalate)" Science Magazine vol. 351 Issue 6278 Mar. 11, 2016 pp. 1196-1199.
"Discover Polysaccharides" Available at http://polysac3db.cermav.cnrs.fr/discover_starch.html; Accessed Feb. 16, 2017, 10 pages.
Tokiwa, et al., "Biodegradability of Plastics" in the International Journal of Molecular Sciences, Aug. 26, 2009, vol. 10, pp. 3722-3742.
International Search Report and Written Opinion for PCT PCT/US2017/068492 dated Mar. 16, 2018, 14 pages.
"Environmentally Degradable Plastics" Leonardo Da Vinci Program; Jan. 2000-Dec. 2006.
Arevalo-Nino et al., "Starch-based extruded plastic films and evaluation of their biodegradable properties" Biodegradation 7: 231-237, 1996.
Chen et al. "Environmental Degradation of Starch/Poly (Lactic Acid) Composite in Seawater" Apr. 6, 2010.
Shogren et al. "Biodegradation of starch/polylactic acid/poly(hydroxyester-ether) composite bars in soil" Polymer Degradation and Stability 79 (2003) 405-411.
"Transition Metal Salts." Oxo-biodegradable Plastics Association, http://www.biodeg.org/index.html. Accessed Apr. 20, 2018.
Luo, Ying, et al. "Accelerating the degradation of polyethylene composite mulches." Plastics Research Online, May 19, 2017. Society of Plastics Engineers (SPE), DOI: 10.2417/spepro.006909 Accessed Apr. 20, 2018.
Shang, Jing, et al. "Photocatalytic Degradation of Polystyrene Plastic under Fluorescent Light." Environmental Science & Technology, Sep. 5, 2003, 37 (19), pp. 4494-4499. American Chemical Society, DOI: 10.1021/es0209464. Accessed Apr. 20, 2018.
Gupta, Apeksha et al. "Visible Range Photocatalysts for Solid Phase Photocatalytic Degradation of Polyethylene and Polyvinyl Chloride." Journal of the Chilean Chemical Society, [S.I.], v. 62, n. 1, Jun. 2017. ISSN 0717-9707. <https://jcchems.com/index.php/JCCHEMS/article/view/156>. Accessed: Apr. 20, 2018.
Oluz, Zehra and Teoman Tincer. "Additives for ultraviolet-induced oxidative degradation of low-density polyethylene." J. Appl. Polym. Sci., 133, 43354, Jan. 18, 2016. Wiley Online Library, DOI: 10.1002/app.43354. Accessed Apr. 21, 2018.
Thryft, Ann R. "Biodegradable Plastics Standard to Bust Landfill Waste." ENSO Plastics, Nov. 15, 2011. http://ensoplastics.com/theblog/?p=535. Accessed Apr. 23, 2018.
Esmaeili, Atefeh, et al. "Biodegradation of Low-Density Polyethylene (LDPE) by Mixed Culture of Lysinibacillus xylanilyticus and Aspergillus niger in Soil." PLoS ONE 8(9): e71720, Sep. 23, 2013. https://doi.org/10.1371/journal.pone.0071720. Accessed Apr. 16, 2018.
Sumathi, Tirupati et al. "Production of Laccase by *Cochliobolus* sp. Isolated from Plastic Dumped Soils and Their Ability to Degrade Low Molecular Weight PVC." Biochemistry Research International 2016 (2016): 9519527. PMC. Web. Apr. 16, 2018.
Zhang, et al. "Retrogradation and Antiplasticization of Thermoplastic Starch" Mar. 2012.
Cardia Bioplastics Faq [online] [site accessed Oct. 23, 2018] URL: http://www.cardiabioplastics.com/our-business/faq.
Fujisawa, et al. "Degradation of Polyethylene and Nylon 66 by the Laccase-Mediator System" Journal of Polymers and the Environment, vol. 9, Issue 3, 2001, pp. 103-108.
Eyheraguibel, et al. "Characterization of oxidized oligomers from polyethylene films by mass spectrometry and NMR spectroscopy before and after biodegradation by a Rhodococcus rhodochrous strain" Chemosphere 184, 2017, pp. 366-374.
Ohtake, et al. "The Biodegradability of Polyethylene" Material Life, vol. 6, Issue 3, 1994, pp. 125-133.
PCT International Search Report and Written Opinion for PCT/US2018/026610 dated Jul. 13, 2018.
Bastioli et al. "Starch in Polymers Technology" ACS Symposium Series, Jan. 1, 2012, American Chemical Society/Oxford University Press, XP055490447, vol. 1114, pp. 87-112.
Van Soest et al. "Crystallinity in Starch Plastics: Consequences for Material Properties" Trends in Biotechnology, vol. 15, No. 6, Jun. 1, 1997, pp. 208-213.
Tena-Salcido et al. "Effect of Morphology on the Biodegradation of Thermoplastic Starch in LDPE/TPS Blends" Polymer Bulletin, vol. 60, No. 5, Jan. 30, 2008, pp. 677-688.
Pearce "Biodegradable plastic bags carry more ecological harm than good" The guardian, Jun. 18, 2009.
FPA "The Flexible Packaging Association Position on Degradable Additives", Jun. 21, 2010.
Oxo-Biodegradable Plastics Association "French Proposal for Law on Biodegradable Plastics", Revised Oct. 31, 2013.
Natur Bag "Case Study: Compostable vs Oxo Degradable", Feb. 19, 2019.
SPI Bioplastics Division "Position Paper on Degradable Additives", issued Feb. 2016.
European Commission "Report from the Commission to the European Parliament and the Council on the Impact of the Use of Oxo-Degradable Plastic, Including Oxo-Degradable Plastic Carrier Bags, on the Environment", Brussels, Jan. 16, 2018.
MJS Packaging, "What Are Oxo-biodegradable Additives" May 8, 2014.
BPI "Background on Biodegradable Additives", Feb. 12, 2010.
Ahmed et al. Biodegradation of plastics: current scenario and future prospects.
Marianne Shirai "Thermoplastic starch/polyester films: Effects of extrusion process and poly (lactid acid) addition," Elsevier, Materials Science and Engineering, 2013, pp. 4112-4117.
Emmanuel Schwach "Starch-based biodegradable blends: morphology and interface properties," Polymer International, 2004, pp. 2115-2124.
Jie Ren "Preparation, characterization and properties of binary and ternary blends with thermoplastic starch, poly (lactic acid) and poly(butylene adipate-co-terephthalate)," Elsevier, Carbohydrate Polymers, 2008, pp. 576-582.

(56) References Cited

OTHER PUBLICATIONS

S.K. Nayak "Biodegradable PBAT/Starach Nanocomposites" Polymer-Plastics Technology and Engineering, 2010, pp. 1406-1418.
*Fine Chemical Engineering Green Production Process*, 1$^{st}$ edition, edited by Qihuang Song, Guangdong Science & Technology Press, published on Mar. 31, 2006, p. 174.
U.S. Appl. No. 14/853,725, Apr. 28, 2017, Office Action.
U.S. Appl. No. 14/853,725, Nov. 8, 2017, Final Office Action.
U.S. Appl. No. 14/853,725, Oct. 12, 2018, Office Action.
U.S. Appl. No. 14/853,780, Oct. 12, 2016, Office Action.
U.S. Appl. No. 14/853,780, May 24, 2017, Final Office Action.
U.S. Appl. No. 14/853,780, Nov. 6, 2017, Office Action.
U.S. Appl. No. 14/853,780, Aug. 10, 2018, Office Action.
U.S. Appl. No. 14/853,780, Feb. 28, 2019, Office Action.
U.S. Appl. No. 15/481,806, Apr. 30, 2018, Office Action.
U.S. Appl. No. 15/481,806, Oct. 12, 2018, Office Action.
U.S. Appl. No. 15/481,806, Feb. 28, 2019, Office Action.
U.S. Appl. No. 15/481,806, Nov. 6, 2019, Final Office Action.
U.S. Appl. No. 15/481,823, Apr. 30, 2018, Office Action.
U.S. Appl. No. 15/481,823, Oct. 12, 2018, Office Action.
U.S. Appl. No. 15/481,823, Feb. 28, 2019, Office Action.
U.S. Appl. No. 15/628,379, Apr. 30, 2018, Office Action.
U.S. Appl. No. 15/628,379, Oct. 3, 2018, Notice of Allowance.
U.S. Appl. No. 15/691,588, Apr. 30, 2018, Office Action.
U.S. Appl. No. 15/691,588, Jan. 2, 2019, Office Action.
U.S. Appl. No. 15/691,588, May 10, 2019, Office Action.
U.S. Appl. No. 15/836,555, Aug. 12, 2019, Office Action.
U.S. Appl. No. 15/691,588, Dec. 9, 2019, Final Office Action.
U.S. Appl. No. 15/481,823, Dec. 9, 2019, Office Action.
Ruchuan et al., "Study on Starch-Polyethylene Film", Journal of Tianjin University, No. 2, 1990, pp. 23-29.
English Abstract of by 21006 Cl. Apr. 2017.
Office Action received for U.S. Appl. No. 15/836,555, dated Nov. 30, 2020.
Office Action received for U.S. Appl. No. 16/391,909, dated Dec. 1, 2020.

\* cited by examiner

CARBOHYDRATE-BASED PLASTIC MATERIALS WITH REDUCED ODOR

CROSS-REFERENCE TO RELATED APPLICATIONS

This application is a continuation in part of PCT Application No. PCT/US2017/068492 filed Dec. 27, 2017, which claims the benefit of U.S. application Ser. No. 15/481,806 (21132.1) filed Apr. 7, 2017; U.S. application Ser. No. 15/481,823 (21132.2) filed Apr. 7, 2017; U.S. application Ser. No. 15/691,588 (21132.7) filed on Aug. 30, 2017; U.S. application Ser. No. 15/836,555 (21132.4.1) filed on Dec. 8, 2017; U.S. Application No. 62/610,615 (21132.9) filed on Dec. 27, 2017; U.S. Application No. 62/610,618 (21132.12) filed on Dec. 27, 2017; U.S. Application No. 62/440,399 (21132.10) filed on Dec. 29, 2016; U.S. Application No. 62/442,432 (21132.11) filed on Jan. 4, 2017; and U.S. Application No. 62/483,219 (21132.4), filed Apr. 7, 2017. The entire contents of each of the foregoing is incorporated by reference herein.

This application is also a continuation in part of U.S. application Ser. No. 15/691,588 (21132.7) filed on Aug. 30, 2017 which is a continuation in part of U.S. application Ser. No. 14/853,725 (21132.8) filed on Sep. 14, 2015 which claims the benefit of U.S. Provisional Patent Application No. 62/187,231 filed on Jun. 30, 2015. U.S. application Ser. No. 15/691,588 (21132.7) is also a continuation in part of U.S. application Ser. No. 14/853,780 (21132.6) filed on Sep. 14, 2015, and a continuation in part of U.S. application Ser. No. 15/481,806 (21132.1) and Ser. No. 15/481,823 (21132.2), both filed on Apr. 7, 2017. U.S. application Ser. No. 15/691,588 (21132.7) also claims the benefit of U.S. Provisional Patent Application No. 62/440,399 (21132.10) filed on Dec. 29, 2016, and U.S. Provisional Patent Application No. 62/442,432 (21132.11) filed on Jan. 4, 2017. The entire contents of each of the foregoing is incorporated by reference herein.

U.S. Provisional Patent Application No. 62/483,109 (21132.5), filed Apr. 7, 2017 is also incorporated by reference herein, in its entirety.

BACKGROUND

Traditional petrochemical-based plastics are formulated to be strong, lightweight, and durable. However, these plastics are typically not biodegradable, and of course require substantial quantities of petrochemical materials for their manufacture. One alternative that has shown some promise for increasing sustainability of the resulting plastic material is to replace a portion of the petrochemical material with starch or a starch-based material. One issue with addition of such starch or starch-based materials is that the inclusion of a significant fraction of starch or a starch-based material in the plastic composition can result in a noticeable odor associated with the inclusion of such in an article formed from such a blend. For example, the material may take on a slightly burned starch odor, a popcorn-like odor, or a caramel corn type odor. While some may find the odor pleasant, or even desirable, others would prefer that no such odor be present, such as would be the case for a plastic formed without the starch or starch-based material present (e.g., formed from polyethylene or another typical polymeric resin, alone).

SUMMARY

This disclosure is directed to use of sustainable plastic resin materials, and methods for reducing a characteristic odor attributable to inclusion of a starch-based polymeric material, or other carbohydrate-based polymeric material. The sustainable plastics and resins include a carbohydrate-based polymeric material, such as a starch-based polymeric material. Applicant has found that such starch-based polymeric materials exhibit a characteristic slightly burned starch, popcorn, or caramel corn type odor. While not typically overpowering, this odor is typically noticeable in some articles formed from blends of materials including the carbohydrate-based polymeric material, particularly where the geometry of the finished article may be relatively "closed" (e.g., such as in a cup, or other enclosed structure where a volume is bounded by the plastic material on two, three, or more sides. Such a characteristic odor may tend to accumulate within such an enclosed volume, so as to become noticeable to a consumer or other use (e.g., if a user were to put their nose into such a cup and sniff).

Applicant desires to remove or minimize such characteristic odor, so that the odor would be similar or identical to the odor (typically substantially odorless) that would exist if the article were instead formed from a standard, petrochemical-based polymeric material. For example, articles according to the present invention may be formed from a blend of such standard petrochemical-based polymeric material and the carbohydrate-based polymeric material, as described in numerous applications of Applicant, already incorporated by reference. Applicant has discovered that the characteristic odor may be substantially removed or minimized by addition of a very small fraction of an organic odor-reducing agent.

While some attempts may have been made previously by others to reduce odor resulting from a distillers dried grains (DDG) material, e.g., as described in WO2009058426, such treatment required addition of relatively high fractions of activated carbon or steam activated anthracite materials. While perhaps effective to some degree, the concentration of such materials required is high, and the cost of such materials is prohibitive, such that commercial application of such embodiments is not particularly feasible. In addition, addition of high fractions of dark colored activated carbon or activated anthracite materials may be undesirable, given their tendency to act as a pigment under certain conditions, coloring the plastic material. Such may be particularly problematic where a high clarity film, a light colored article, or other similar article, is desired. It would be advantageous if the additive were colorless, or of the same color as the resin material being blended with (e.g., clear, white, etc.). Of course, where a black or dark plastic material is desired, this can be achieved by addition of such a colorant, although it is advantageous that the odor reducing additive not be black or dark colored, to provide the flexibility to achieve a clear, white, or light colored plastic article.

An embodiment of the present invention is directed to a sustainable plastic material exhibiting reduced odor that may include a polymeric resin, an organic odor-reducing agent, and a carbohydrate-based polymeric material, wherein in the absence of the organic odor-reducing agent, the carbohydrate-based polymeric material would lend a characteristic burned carbohydrate odor to the sustainable plastic material. In an embodiment, the organic odor-reducing agent may comprise an aromatic compound (e.g., including an aromatic ring), such as a benzaldehyde compound, a benzyl ketone compound, or other structure including an aromatic ring. In an embodiment, the organic odor-reducing agent may comprise a freeze dried or other extract from a fruit or vegetable, such as vanillin. The organic odor-reducing agent may actually be extracted from such a fruit, vegetable, or other plant, or may comprise an aromatic compound typically found in such an extract, but which has been synthetically produced (e.g., synthetic vanillin or another synthetic aromatic compound may be suitable). Vanillin is an aromatic benzaldehyde compound also known as 4-hydroxy-3-methoxybenzaldehyde.

Applicant has surprisingly found that very small fractions of such an aromatic odor-reducing agent are sufficient to substantially remove any characteristic odor otherwise attributable to the carbohydrate-based polymeric material included in the blend making up the sustainable plastic material. For example, the weight ratio of an odor-reducing agent to the carbohydrate-based polymeric material to substantially remove the odor is on the order of 1:1000 or less of the odor-reducing agent. For example, as little as 100 ppm, 50 ppm, or even 20 ppm or less is sufficient to remove all practical sign of the characteristic odor.

Such is particularly surprising, given that so little of the odor-reducing agent is needed to remove the odor. Because so little is required, and the odor does not typically seem to be replaced or masked by any odor provided by the odor-reducing agent, it is believed that the mechanism in play may not be a simple masking of the characteristic carbohydrate odor. Although any such mechanism is not perhaps fully understood, it is possible that there may be a chemical interaction between such aromatic or other organic odor-reducing agents and the characteristic odorous compounds generated upon heating the carbohydrate-based polymeric material during melting and forming of the thermoplastic blend into the desired article.

The odor-reducing agent may be included with the carbohydrate-based polymeric material, e.g., in a masterbatch thereof. Thus, one embodiment may be directed to such a sustainable thermoplastic carbohydrate-based polymeric material exhibiting reduced odor that includes the organic odor-reducing agent pre-blended with the carbohydrate-based polymeric material. A weight ratio of the organic odor-reducing agent to the carbohydrate-based polymeric material is no more than 1:1000 (i.e., at least 1000 times more carbohydrate-based polymeric material as compared to the amount of the odor-reducing agent). In an embodiment, the ratio of odor-reducing agent to carbohydrate-based polymeric material may be far more dilute, e.g., such as 1:50,000 (i.e., 20 ppm).

It will be apparent that the present invention also encompasses related methods, e.g., methods of reducing a characteristic odor of a material blend including a carbohydrate-based polymeric material, e.g., by including a small fraction of an organic odor-reducing agent within the blend. Where the carbohydrate-based polymeric material is provided as a masterbatch, the odor-reducing agent may be provided within the masterbatch, already blended with the carbohydrate-based polymeric material. As such, when the masterbatch is then blended with a polymeric resin material (e.g., any of numerous various plastic resins, such as PE, PP, other polyolefins, polyesters, polystyrenes, PBAT, polycarbonate, or others), the blended material also then includes the odor-reducing agent blended therein.

These and other advantages and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

I. Definitions

Figure 1:
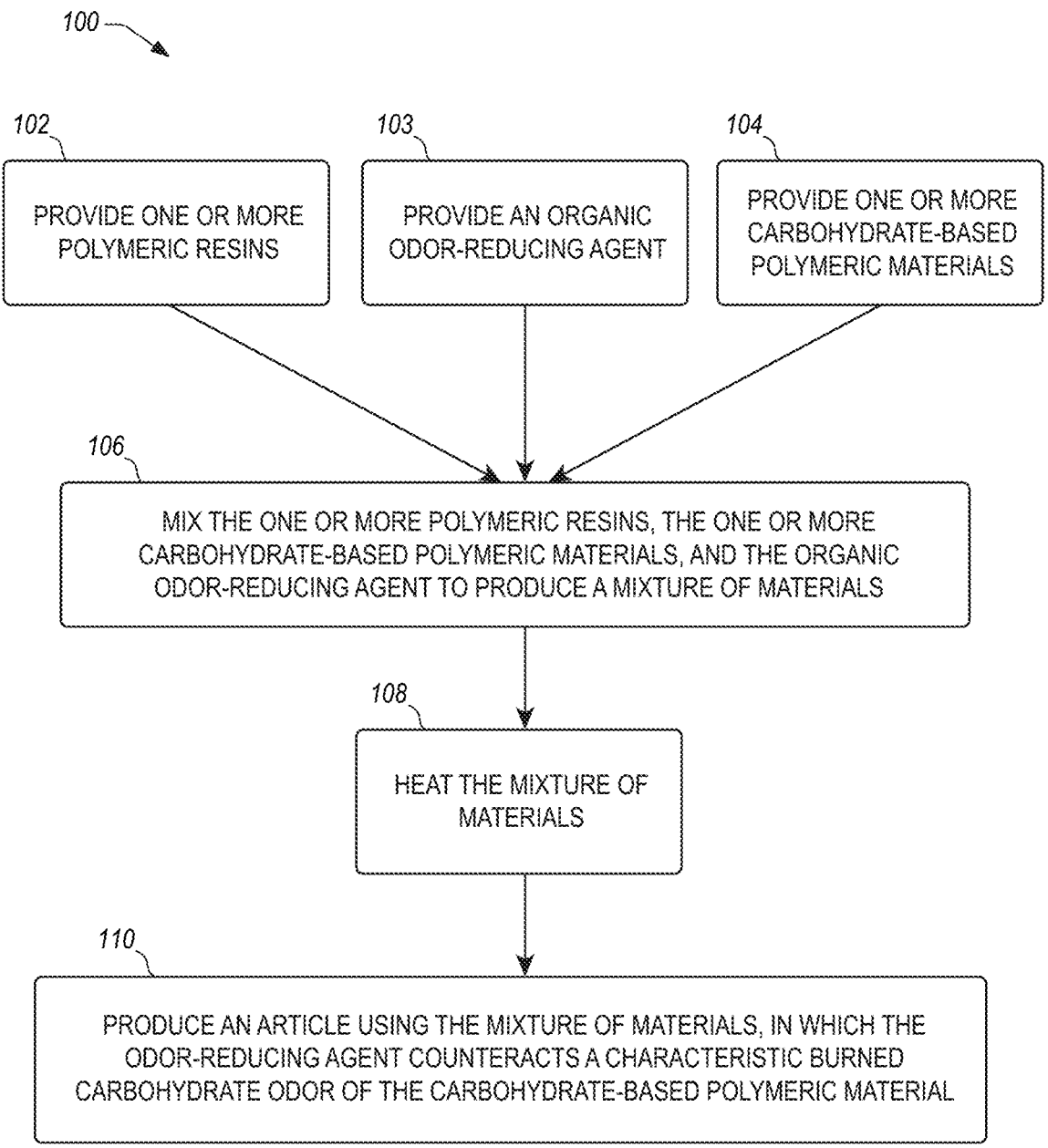
FIG. 1 illustrates a flow diagram of an example process for forming an article from a polymeric resin, a carbohydrate-based polymeric material, and an odor-reducing agent that counteracts a characteristic odor of the carbohydrate-based polymeric material.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

The terms "a," "an," "the" and similar referents used in the context of describing the inventive features (especially in the context of the following claims) are to be construed to cover both the singular and the plural, unless otherwise indicated herein or clearly contradicted by context. Thus, for example, reference to a "starch" can include one, two or more starches.

"Film," as used herein, refers to a thin continuous article that includes one or more polymeric materials that can be used to separate areas or volumes, to hold items, to act as a barrier, and/or as a printable surface.

"Bag," as used herein, refers to a container made of a relatively thin, flexible film that can be used for containing and/or transporting goods.

"Bottle," as used herein, refers to a container that can be made from the presently disclosed plastics, typically of a thickness greater than a film, and which typically includes a relatively narrow neck adjacent an opening. Such bottles may be used to hold a wide variety of products (e.g., beverages, personal care products such as shampoo, conditioner, lotion, soap, cleaners, and the like).

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical manufacturing process, and may include values that are within 25%, 15%, 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 25% of, within 15% of, within 10% of, within 5% of, or within 1% of, a stated amount or value.

Some ranges are disclosed herein. Additional ranges may be defined between any values disclosed herein as being exemplary of a particular parameter. All such ranges are contemplated and within the scope of the present disclosure. Further, recitation of ranges of values herein is intended to serve as a shorthand method of referring individually to each separate value falling within the range. Unless otherwise indicated herein, each individual value is incorporated into the specification as if it were individually recited herein.

All numbers expressing quantities of ingredients, constituents, conditions, and so forth used in the specification and claims are to be understood as being modified in all instances by the term "about". Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase 'free of' or similar phrases as used herein means that the composition comprises 0% of the stated component, that is, the component has not been intentionally added to the composition. However, it will be appreciated that such components may incidentally form under appropriate circumstances, may be incidentally present within another included component, e.g., as an incidental contaminant, or the like.

The phrase 'substantially free of' or similar phrases as used herein means that the composition preferably comprises 0% of the stated component, although it will be appreciated that very small concentrations may possibly be present, e.g., through incidental formation, incidental contamination, or even by intentional addition. Such components may be present, if at all, in amounts of less than 1%, less than 0.5%, less than 0.25%, less than 0.1%, less than 0.05%, less than 0.01%, less than 0.005%, less than 0.001%, less than 0.0001%, or less than 0.00001%.

II. Introduction

The present disclosure is directed to, among other things, sustainable plastic materials including a carbohydrate-based polymeric material, in which a burned carbohydrate characteristic odor resulting during typical heating and molding or other forming of the plastic material is counteracted by inclusion of a very small fraction of an organic odor-reducing agent. In an embodiment, the odor-reducing agent may be included with the carbohydrate-based polymeric material (e.g., as part of a masterbatch of the carbohydrate-based polymeric material).

In an embodiment, the carbohydrate-based polymeric material may be present at far higher fractions than the odor-reducing agent. For example, the carbohydrate-based polymeric material may be at least 1000 times, 10,000 times, or 50,000 times more plentiful than the odor-reducing agent. Even at very small concentrations (e.g., 1 part odor-reducing agent to 50,000 parts carbohydrate-based polymeric material), effective control (i.e., substantially complete removal) of the popcorn, caramel corn, or slightly burned starch odor can be achieved. It is surprising that such a small fraction of the odor-reducing agent is sufficient to achieve such results.

A masterbatch including the odor-control agent and the carbohydrate-based polymeric material can be blended with practically any conceivable polymeric resin material, and used to produce a desired plastic article. For example, articles can be produced by mixing the carbohydrate-based polymeric material (including an odor-reducing agent) with the polymeric resin, heating the mixture, and molding (e.g., injection molding) the mixture, extruding the mixture, blow molding the mixture, blow-forming the mixture (e.g., forming a blown film), thermoforming the mixture, or the like. The forgoing list of plastic manufacturing processes is of course not exhaustive, and various other plastic manufacturing processes will be apparent to those of skill in the art.

The articles described herein can be produced in the form of any conceivable structure, including, but not limited to bottles, boxes, other containers, cups, plates, utensils, sheets, films, bags, and the like. Thin films for bags and film wraps (e.g., for wrapping around or over a product) can easily be made using blown film equipment.

Examples of suitable carbohydrate-based (e.g., starch-based) polymeric materials for use in forming such articles are available from BiologiQ, under the tradename NuPlastiQ. Specific examples include, but are not limited to NuPlastiQ GP, NuPlastiQ CG, NuPlastiQ XP, NuPlastiQ XD and NuPlastiQ MB. Specific characteristics of such NuPlastiQ materials will be described in further detail herein. Other carbohydrate-based or starch-based polymeric materials may also be suitable for use. A small fraction of an odor-reducing agent may be included within the carbohydrate-based polymeric material, introduced with a polymeric resin with which the carbohydrate-based polymeric material is being blended, or otherwise introduced into the blend. In an embodiment, a masterbatch of the carbohydrate-based polymeric material may be provided with the odor-reducing agent already included therein. In another embodiment, the odor-reducing agent could be added separate from the carbohydrate-based polymeric material, and/or separate from a polymeric resin that is included in the blend from which an article is to be formed. Besides NuPlastiQ available from BiologiQ, it will be apparent that other carbohydrate-based or starch-based polymeric materials could also benefit from addition of a small fraction of an odor-reducing agent as described herein.

III. Exemplary Articles and Methods

FIG. 1 illustrates an exemplary process 100 according to the present invention for producing an article that includes a carbohydrate-based polymeric material, an organic odor-reducing agent, and a polymeric resin. At 102, the process 100 can include providing one or more polymeric resins. Such resins may be any of a vast number traditionally used in plastics manufacture. Such resins may be derived from non-sustainable petroleum sources, or could be sourced from sustainable sources (e.g., green PE, bioPET, or the like). Such resins may be thermoplastics that are not biodegradable, or could be materials that are biodegradable and/or compostable (e.g., PBAT, PLA, PHA or the like). A non-exhaustive listing of such polymeric resins include, but are not limited to polyethylene, polypropylene, other polyolefins, polyethylene terephalate, polyesters, polystyrenes, ABS, PBAT, PLA, PHA, polyvinyl chloride, nylon, polycarbonate and the like). At 103 and 104 respectively, the process 100 includes providing an organic odor-reducing agent and a carbohydrate-based polymeric material.

In an embodiment, the odor-reducing agent could be included with the carbohydrate-based polymeric material (e.g., included in a masterbatch thereof). In other embodiments, the odor-reducing agent could be added through another pathway, e.g., with the polymeric resin, separate from both the polymeric resin and the carbohydrate-based polymer, etc. It will be apparent that various pathways for such addition are contemplated and possible. The odor-reducing agent is specifically selected for inclusion in the blend for its ability to counter-act an odor otherwise lent to the finished product by the carbohydrate-based polymeric material. For example, the carbohydrate based polymeric material may otherwise lend a slight burned carbohydrate odor (e.g., slightly burned starch odor, a popcorn or caramel corn-like odor) that occurs during heat processing of the blend (e.g., during injection molding, blow molding, film blowing, or the like), where the mixture of components at 102, 103, and 104 are melted together, and formed while in a heated condition. The one or more carbohydrate-based polymeric materials can include starch-based polymeric materials. The carbohydrate-based polymeric materials and the polymeric resins can be provided in a desired form, such as pellets, powders, nurdles, slurry, and/or liquids. In specific embodiments, the materials can be in the form of pellets.

The odor-reducing agent at 103 could also be in any such desired form (e.g., pellets, powders, nurdles, slurry and/or liquid). In an embodiment, the odor-reducing agent may initially comprise a freeze dried powder which may be mixed into a masterbatch of the carbohydrate-based polymeric material during manufacture, or after manufacture of the carbohydrate-based polymeric material. For example, where the carbohydrate-based polymeric material is formed from a mixture of starch powder(s), glycerin, and water, the odor-reducing agent (e.g., as a freeze dried powder) could simply be added to the mixture with the starch powder(s), or to the water, or plasticizer (e.g., glycerin), and mixed therewith. The carbohydrate-based polymeric material could then be manufactured by the same process by which it is normally produced (e.g., a reactive extrusion process), allowing the odor-reducing agent to become incorporated into the carbohydrate-based polymeric material as a dispersed component therein (e.g., homogeneously dispersed therein).

In another embodiment, the powdered or other odor-reducing agent could be simply mixed in with the carbohydrate-based polymer, as it is melted and prepared for combination with other components (e.g., compatibilizer) being included in the masterbatch. It will be apparent to those of skill in the art that numerous possibilities exist for adding the odor-reducing agent to any of the components that go into forming a plastic article from a blend of a carbohydrate-based polymeric material and a polymeric resin. Various such alternative pathways for incorporation of the organic odor-reducing agent may also be suitable for use.

No matter the pathway selected for introduction of the odor-reducing agent into the blend, the blend of components at 102, 103, and 104 may be formed through any conceivable process. An example of such would be an extrusion process. For example, the polymeric resin and the carbohydrate-based polymeric material (e.g., including an odor-reducing agent in a masterbatch thereof) can be feed into an extruder (e.g., into one or more hoppers thereof). The different materials can be fed into the extruder into the same chamber, into different chambers, at approximately the same time (e.g., through the same hopper), or at different times (e.g., through different hoppers, one being introduced into the extruder earlier on along the screw than the other), etc. It will again be apparent that many numerous possibilities are possible.

A. Odor-Reducing Agent

The odor-reducing agent may be organic. Those of skill in the chemical arts will appreciate that organic compounds are carbon based (e.g., including carbon-carbon bonds), but exclude simple carbon compounds such as carbides, carbonates, oxides of carbon (e.g., CO and $CO_2$), and cyanides. In an embodiment, the organic odor-reducing agent may include a benzyl or phenyl group, being an aromatic compound. Various aromatic compounds, such as benzaldehydes and/or benzyl ketones may be suitable for use. In an embodiment, the organic odor-reducing agent may be a compound including only carbon, oxygen, and hydrogen atoms (e.g., no heteroatoms). In other embodiments, compounds including one or more heteroatoms may prove suitable for use. In an embodiment proven to be particularly effective, the odor-reducing agent comprises a benzaldehyde compound, such as 4-hydroxy-3-methoxybenzaldehyde. Such an aromatic compound is also known as vanillin, having the chemical structure shown below.

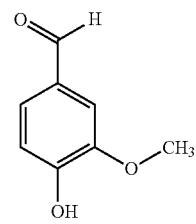

A very small fraction of the organic odor-reducing agent has been found to be sufficient to counteract the odor associated with the carbohydrate-based polymeric material. In addition to the fact that so little odor-reducing agent is required, it is also surprising that problems associated with addition of an organic component (the carbohydrate-based polymeric material) could be solved by addition of even more organic components. For example, one of skill in the art might expect such inclusion of additional organic component(s), particularly one having an aromatic chemical structure, to add to the odor released by the blend upon heat processing, rather than reducing or substantially eliminating such odors.

In an embodiment, no inorganic or other odor-reducing agents are included within the composition. For example, in an embodiment, no activated carbon, zeolite, or other components known to include active sites capable of binding odorous volatile molecules are included within the composition. For example, the inclusion of such odor-reducing agents that operate on a mechanism that relies on binding at active sites might somehow inhibit the ability of the benzaldehyde or other organic odor-reducing agent to perform its intended function (e.g., such active sites may merely serve to bind the benzaldehyde or other organic odor-reducing agent).

The odor-reducing agent may comprise no more than 1%, no more than 0.5%, no more than 0.25%, no more than 0.1%, no more than 0.05%, no more than 0.01%, no more than 1000 ppm, no more than 500 ppm, no more than 250 ppm, no more than 100 ppm, no more than 50 ppm, or no more than 20 ppm, of either the blended plastic material as a whole, or relative to a carbohydrate-based polymeric material that also includes the odor-reducing agent provided therein (e.g., as a masterbatch, for blending with another polymeric resin). Upon blending such a carbohydrate-based polymeric material with another polymeric resin, the concentration of the odor-reducing agent may of course be further diluted. For example, if the concentration of such odor-reducing agent is 20 ppm in such masterbatch with the carbohydrate-based polymeric material, once blended with the conventional plastic resin material, the concentration of odor reducing agent in the final plastic blended article may be no more than 15 ppm, no more than 10 ppm, no more than 5 ppm, or even 1 ppm. Such tiny fractions have surprisingly been found by Applicant to be effective in counteracting and substantially removing the odor characteristic of a plastic including a carbohydrate-based polymeric material.

In addition to vanillin, other extracts from various fruits and/or vegetables may also be suitable for use as organic odor-reducing agents. Non-limiting possible examples include freeze dried extracts from vanilla, strawberry, blueberry, banana, apple, peach, pear, kiwi, mango, passionfruit, or raspberry. Combinations may also be suitable for use.

B. Polymeric Resins and Carbohydrate-Based Polymeric Materials

In some cases, the polymeric resin can include a polyolefin. For example, such plastic materials may include, but are not limited to polyethylene, polypropylene, polyethylene terephthalate, other polyolefins, polyester, polystyrene, ABS, polyvinyl chloride, nylon, polycarbonates, and the like. Such plastic material may be sourced from petrochemical sources, or from so-called "green" or sustainable sources (e.g., "green" PE, bioPET, and the like), as desired.

The carbohydrate-based polymeric materials can be formed from a plurality of materials (e.g., a mixture) including one or more starches. For example, the one or more starches can be produced from one or more plants, such as corn starch, tapioca starch, cassava starch, wheat starch, potato starch, rice starch, sorghum starch, and the like. In some embodiments, a mixture of different types of starches may be used. A plasticizer is also typically present within the mixture of components from which the carbohydrate-based polymeric materials are formed. Water may also be used in forming the carbohydrate-based polymeric material, although only a small to negligible amount of water is present in the finished carbohydrate-based polymeric material. As noted above, in an embodiment, the odor-reducing agent can be added to the water and/or glycerin (e.g., dissolved or dispersed therein), which may be particularly beneficial in ensuring homogenous mixing of the very small fraction of the odor-reducing agent throughout the finished carbohydrate-based polymeric material. For example, while a powdered odor-reducing agent could be added to the other powdered materials (e.g., starch(es)) that go into making the carbohydrate-based polymeric material, because the amount of addition of the odor-reducing agent is so small (e.g., 20 ppm in the masterbatch), it may be easier to ensure homogenous distribution of the odor-reducing agent by mixing it with the liquid component(s), rather than in with the solid powder(s), for dissolution or suspension therein.

The one or more carbohydrate-based polymeric materials can be formed from mostly starch. For example, at least 65%, at least 70%, at least 75%, or at least 80% by weight of the carbohydrate-based polymeric material may be attributable to the one or more starches. In an embodiment, from 65% to 90% by weight of the finished carbohydrate-based polymeric material may be attributed to the one or more starches. Other than negligible water content in the finished NuPlastiQ product, the balance of the finished carbohydrate-based polymeric material may be attributed to the plasticizer (e.g., glycerin), as well as a tiny fraction (e.g., 20 ppm) of the odor-reducing agent. The percentages above may represent starch percentage relative to the starting materials from which the carbohydrate-based polymeric material is formed, or that fraction of the finished carbohydrate-based polymeric material that is derived from or attributable to the starch (e.g., at least 65% of the carbohydrate based polymeric material may be attributed to (formed from) the starch(es) as a starting material).

As mentioned, although some water may initially be present for use in forming the carbohydrate-based polymeric material, substantially the balance of the finished carbohydrate-based polymeric material may be attributed to glycerin, or another plasticizer, as well as the odor-reducing agent. Once the carbohydrate-based polymeric material has been formed, this may be further processed into a masterbatch thereof, e.g., which may include a compatibilizer, or other components included therein. General techniques for preparing masterbatches will be apparent to those of skill in the art. Very little residual water (e.g., less than 2%, typically no more than 1.5%, or no more than about 1%) may be present in the finished carbohydrate-based polymeric material.

For example, the materials from which the one or more carbohydrate-based polymeric materials are formed can include at least 12%, at least 15%, at least 18%, at least 20%, at least 22%, no greater than 35%, no greater than 32%, no greater than 30%, no greater than 28%, or no greater than 25% by weight of a plasticizer. Such percentages may represent that fraction of the finished carbohydrate-based polymeric material that is derived from or attributable to the plasticizer (e.g., at least 12% of the carbohydrate based polymeric material may be attributed to (formed from) the plasticizer as a starting material).

Exemplary plasticizers include, but are not limited to glycerin, polyethylene glycol, sorbitol, polyhydric alcohol plasticizers, hydrogen bond forming organic compounds which do not have a hydroxyl group, anhydrides of sugar alcohols, animal proteins, vegetable proteins, aliphatic acids, phthalate esters, dimethyl and diethylsuccinate and related esters, glycerol triacetate, glycerol mono and diacetates, glycerol mono, di, and tripropionates, butanoates, tearates, lactic acid esters, citric acid esters, adipic acid esters, stearic acid esters, oleic acid esters, other acid esters, or combinations thereof. Glyerin may be preferred.

The finished carbohydrate-based polymeric material may include no greater than 5%, no greater than 4%, no greater than 3%, no greater than 2%, no greater than 1.5%, no greater than 1.4%, no greater than 1.3%, no greater than 1.2%, no greater than 1.1%, or no greater than 1% by weight water. The NuPlastiQ materials available from BiologiQ are examples of such finished carbohydrate-based polymeric materials, although it will be appreciated that other materials available elsewhere may also benefit from inclusion of an odor-reducing agent therein. The odor-reducing agent may be incorporated into NuPlastiQ materials available from BiologiQ, or incorporated into other carbohydrate-based materials available from others, to counteract any odor that may be characteristic of such materials, when they are employed in forming an article where such process includes application of heat (which application may be almost universal).

In some embodiments, mixtures of different starches may be used in forming the carbohydrate-based polymeric material. In such a mixture of starches, a starch can be present in the mixture in an amount of at least 1%, at least 2%, at least 3%, at least 4%, at least 5%, at least 10%, at least 15%, at least 20%, at least 25%, at least 30%, at least 35%, at least 40%, no greater than 95%, no greater than 90%, no greater than 85%, no greater than 80%, no greater than 75%, no greater than 70%, no greater than 65%, no greater than 60%, no greater than 55%, no greater than 50%, or from 10% to 50% by weight relative to the combined weight of the plurality of starches. Some non-limiting exemplary mixtures may include 90% of a first starch, and 10% of a second starch, or 30% of a first starch and 70% of a second starch, or 50% of a first starch and 50% of a second starch. Mixtures of more than two starches (e.g., using 3 or 4 different starches) can also be used.

Examples of suitable carbohydrate-based (e.g., starch-based) polymeric materials for use in forming films and other articles are available from BiologiQ, located in Idaho Falls, Id., under the tradename NuPlastiQ, and formerly "ESR" ("Eco Starch Resin"). Specific examples of NuPlastiQ include, but are not limited to NuPlastiQ GP, NuPlastiQ CG, NuPlastiQ XP, NuPlastiQ XD, NuPlastiQ MB and NuPlastiQ BC. Under the tradename ESR, such materials have previously been referred to as GS-270, GS-300, and GS-330. Specific characteristics of such NuPlastiQ materials will be described in further detail herein. Additional details relative to fractions of starch and glycerin or other plasticizers used in forming NuPlastiQ are described in Applicant's other patent applications, already incorporated herein by reference. NuPlastiQ may be provided in pellet form. Physical characteristics for two examples of NuPlastiQ materials, previously referred to as GS-270 and GS-300, are shown in Table 1 below.

TABLE 1

| PROPERTY | TEST METHOD | GS-270 NOMINAL VALUE | GS-300 NOMINAL VALUE |
| --- | --- | --- | --- |
| Density | ASTM D-792 | 1.40 g/cm³ | 1.42 g/cm³ |
| THERMAL PROPERTIES | | | |
| Melt Flow Index 200° C./5 kg | ASTM D-1238 | 1.98 g/10 min | 1.95 g/10 min |
| Melting Temp. Range | ASTM D-3418 | 166-180° C. | 166-180° C. |
| Glass Transition Temp. | ASTM D-3418 | 81-100° C. | 81-100° C. |
| MECHANICAL PROPERTIES | | | |
| Tensile Strength @ Yield | ASTM D-638 | >30 MPa | >14 MPa |

TABLE 1-continued

| PROPERTY | TEST METHOD | GS-270 NOMINAL VALUE | GS-300 NOMINAL VALUE |
| --- | --- | --- | --- |
| Tensile Strength @ Break | ASTM D-638 | >30 MPa | >14 MPa |
| Young's Modulus | ASTM D-638 | 1.5 GPa | 1.5 GPa |
| Elongation at Break | ASTM D-638 | <10% | <10% |
| Impact Resistance (Dart) | ASTM D-5628 | 3.5 kg | 4.5 kg |
| ADDITIONAL PROPERTIES | | | |
| Water Content | ASTMD-6980 | ≤1.5%, or ≤1% | ≤1.5%, or ≤1% |

While addition of the odor-reducing agent to the carbohydrate-based polymeric material alters the odor characteristics by substantially removing any tendency of a blend of the carbohydrate-based polymeric material and another thermoplastic polymeric resin from exhibiting the otherwise characteristic caramel corn or popcorn type odor, such inclusion does not substantially alter any of the above noted physical or other properties of the NuPlastiQ material. As noted, the odor-reducing agent may be present in the NuPlastiQ material at a range of no more than 1000 ppm, 500 ppm, 250 pp, 200 ppm, 100 ppm, 50 ppm, 40 ppm, 30 ppm, 25 ppm, 20 ppm, from 5 ppm to 50 ppm, from 10 ppm to 50 ppm, or from 15 ppm to 25 ppm. Applicant has found a level of 20 ppm in the NuPlastiQ material to be particularly effective. It will be apparent that upon dilution with the polymeric resin material(s), the concentration of odor-reducing agent in the article formed from such a blend is even lower (e.g., a 20 ppm level in the NuPlastiQ masterbatch may be dropped to only 10 ppm, only 5 ppm, or only 1 ppm in the finished article).

The above characteristics shown for GS-270 and GS-300 are exemplary of other NuPlastiQ products available from BiologiQ, although values may vary somewhat. For example, NuPlastiQ products from BiologiQ may generally have a glass transition temperature ranging from about 70° C. to about 100° C. Those of skill in the art will appreciate that glass transition temperature can be indicative of degree of crystallinity. Values for melting temperature range, density, Young's Modulus, and water content may be identical or similar to those shown above in Table 1. Some characteristics may similarly vary somewhat (e.g., ±25%, or ±10%) from values shown for GS-270 and GS-300. For example, density may be 1.25 g/cm³ or greater. NuPlastiQ has an amorphous structure (e.g., more amorphous than typical raw starch). For example, typical raw starch powder has a mostly crystalline structure (e.g., greater than 50%), while NuPlastiQ has a mostly amorphous structure (e.g., less than 10% crystalline, such as 0-9% crystallinity).

NuPlastiQ has a low water content, as described. As NuPlastiQ absorbs moisture, it exhibits plastic behavior and becomes flexible. When removed from a humid environment, the material dries out and becomes stiff again (e.g., again exhibiting less than about 1% water content). The moisture present in NuPlastiQ (e.g., in pellet form) may be released in the form of steam during processing such as that shown in FIG. 1 (e.g., at the same time that such heat processing otherwise releases odorous compounds causing the described popcorn or caramel like odor). As a result, films or other articles produced from a starch-based polymeric material such as NuPlastiQ blended with a polymeric resin may exhibit even lower water content, as the polymeric resin typically will include no or negligible water, and the water in the NuPlastiQ may typically be released during manufacture of a desired article.

It will also be apparent that while the odor-reducing agent may be organic, it can be important that this component not be volatile, so that it is not simply driven off during hot processing of the article (as the steam mentioned above may be). For example, the odor-reducing agent may be a solid, rather than a liquid at ambient temperature (e.g., 25° C.) and pressure (e.g., 1 atm). If a liquid, the odor-reducing agent may exhibit a volatility that is less than that of water (e.g., as measured relative to vapor pressures at a given temperature and pressure (e.g., STP as noted above)). In an embodiment, the odor-reducing agent may not meet one or more of the regulatory definition(s) for a volatile organic compound. Alternatively, if it does meet such a definition, its content is so low as described herein so as to meet any applicable VOC regulatory requirements. In an embodiment, the odor-reducing agent may have a boiling point greater than any temperatures associated with processing at 108 and 110. That said, the odor-reducing agent may have a melting point that is less than a temperature associated with processing at 108 and/or 110. For example, the odor-reducing agent may be a solid at ambient temperature (e.g., 25° C.), but may be a liquid at an elevated temperature (e.g., 125° C. to 165° C.) at which the processing occurs. 4-hydroxy-3-methoxybenzaldehyde is an example of such an odor-reducing agent.

For example, the odor-reducing agent may have a melting point that is at least 30° C., at least 50° C., less than 200° C., less than 190° C., less than 180° C., less than 175° C., less than 170° C., less than 165° C., less than 160° C., less than 150° C., less than 145° C., less than 140° C., less than 135° C., than 130° C., less than 125° C., less than 120° C., less than 115° C., less than 120° C., less than 115° C., less than 110° C., less than 100° C., from 50° C. to 180° C., from 50° C. to 150° C., or from 60° C. to 100° C. The odor-reducing agent may have a boiling point greater than 150° C., greater than 160° C., greater than 170° C., greater than 180° C., greater than 200° C., greater than 225° C., greater than 250° C., from 150° C. to 500° C., from 200° C. to 400° C., or from 250° C. to 300° C. By way of example, vanillin melts at 81° C. to 83° C., and boils at 285° C. (under standard pressure conditions).

Returning to characteristics of the carbohydrate-based polymeric material, low water content in the carbohydrate-based polymeric material can be important, as significant water content can result in incompatibility with the polymeric resin material, particularly if the article requires formation of a thin film. For example, as any water present vaporizes, this can result in voids within the film or other article, as well as other problems. When blowing a thin film, the carbohydrate-based polymeric material used may preferably include no more than about 1% water. It may be dried before processing to ensure that any water that may have been absorbed during storage is driven off. The carbohydrate-based polymeric material may be hydrophobic, rather than hydrophilic. Such characteristics better match the hydrophobic characteristics of typical resin materials that the carbohydrate-based material is to be blended with. For example, the carbohydrate based polymeric material may provide a wettability value of 40 dyne/cm, or less (e.g., from 30 to 35 dyne/cm). NuPlastiQ (e.g., blended with polyolefin or other plastic resin) may be significantly more hydrophobic than comparable materials.

Low water content is not achieved in the NuPlastiQ material through esterification, as is common in some conventional TPS materials that may include relatively low water content. Such esterification can be expensive and complex to perform. Furthermore, the NuPlastiQ materials that are exemplary of the carbohydrate-based polymeric materials employable herein also typically do not themselves actually include any identifiable starch, or identifiable glycerin, as such, as the starting materials of the NuPlastiQ or other carbohydrate-based polymeric material have been chemically reacted and/or altered (e.g., through a reactive extrusion process). X-ray diffraction patterns of exemplary carbohydrate-based polymeric materials as described below (e.g., and shown in FIG. 4) evidence such chemical alteration, showing that the finished polymeric material may be substantially devoid of starch in such identifiable, native form. In other words, the carbohydrate-based polymeric material is not simply recognized as a mixture including starch and glycerin. The low water content achievable in the carbohydrate-based polymeric material is believed to be due at least in part to the chemical alteration of the starch and plasticizer materials into a thermoplastic polymer, which does not retain water as would native starch, or conventional thermoplastic starches. Where the odor-control agent is included in the carbohydrate-based polymeric material, it is not believed to be chemically altered, but remains in the same form as added (e.g., as 4-hydroxy-3-methoxybenzaldehyde, or other added organic odor-reducing agent).

Returning to FIG. 1, processing at relatively high temperatures may result in some release of volatized glycerin (e.g., visible as smoke). If needed (e.g., where stored pellets may have absorbed additional water), drying of pellets can be performed by simply introducing warm dry air, e.g., at 60° C. for 1-4 hours, which is sufficient to drive off any absorbed water. Pellets should be dried to less than about 1% moisture content prior to processing, particularly if forming a film. NuPlastiQ pellets may simply be stored in a sealed container with a desiccant in a dry location, away from heat to minimize water absorption, and to prevent undesired degradation.

In addition to NuPlastiQ being thermoplastic, the NuPlastiQ may also be thixotropic, meaning that the material is solid at ambient temperature, but flows as a liquid when heat, pressure and/or frictional movement are applied. Advantageously, pellets of NuPlastiQ can be used the same as petrochemical based pellets (any typical polymeric resin pellets) in standard plastic production processes. NuPlastiQ materials and products made therefrom may exhibit gas barrier characteristics. Products (e.g., films) made using such NuPlastiQ pellets exhibit oxygen gas barrier characteristics (e.g., see Examples of Applicant's previous filings, already incorporated by reference). NuPlastiQ materials may be non-toxic and edible, made using raw materials that are all edible. NuPlastiQ and products made therefrom may be water resistant (even hydrophobic), but water soluble. For example, NuPlastiQ may resist swelling under moist heated conditions to the point that pellets (e.g. with a size of 3-4 mm) thereof may not completely dissolve in boiling water within 5 minutes, but a pellet will dissolve in the mouth within about 10 minutes. NuPlastiQ may be stable, in that it may not exhibit any significant retrogradation, even if left in relatively high humidity conditions, which characteristic differs from many other thermoplastic starch materials. Of course, products made with NuPlastiQ may also exhibit such characteristics. If NuPlastiQ is stored in humid conditions, the excess absorbed water can simply be evaporated away, and once the water content is no more than about 1%, it can be used in forming a film or other article.

The NuPlastiQ material also does not typically undergo biodegradation under typical storage conditions, even in relatively humid conditions, as the other conditions typical of a landfill, compost or similar disposal environment containing the particular needed microorganisms are not present. Of course, where such conditions are present, not only does the NuPlastiQ biodegrade, but an otherwise non-biodegradable polymeric resin material blended therewith has surprisingly also been shown to biodegrade.

NuPlastiQ can be cost competitive, being manufactured at a cost that is competitive with traditional polyethylene plastic resins. NuPlastiQ can be mixed with other polymers, including, but not limited to PE, PP, PET, polyester, polystyrene, high impact polystyrene copolymers, acrylonitrile butadiene styrene (ABS), polyvinyl chloride, nylon, and others. While the above non-biodegradable polymers can be rendered biodegradable by blending with NuPlastiQ, it will be appreciated that NuPlastiQ can also be blended with polymers that already are biodegradable and/or compostable, such as polylactic acid (PLA), poly(butylene adipate-co-terephthalate) (PBAT), polybutylene succinate (PBS), polycaprolactone (PCL), polyhydroxyalkanoates (PHA), other so-called thermoplastic starches, as well as various others. PBS, PCL, and PHA are polyesters. Eco-FLEX™ is another example of a plastic material with which the NuPlastiQ carbohydrate-based polymeric material may be blended. For example, the present methods are not limited to blending the carbohydrate-based polymeric material (e.g., NuPlastiQ) with only a non-biodegradable polymeric resin, as it will be appreciated that biodegradable polymeric resins (other than NuPlastiQ) can also be incorporated into the blend, if desired.

By way of further explanation, PLA is compostable, meaning that it can degrade under elevated temperature conditions (i.e., composting conditions), but is technically not "biodegradable". Some of the above listed materials, such as PBS, PCL, and PHA may be both biodegradable and compostable. EcoFLEX™ (a PBAT) is certified as compostable. FTC Green guidelines stipulate that a plastic cannot make an unqualified claim that it is "degradable" unless it will degrade within a "reasonably short period of time" (most recently defined as within 5 years) "after customary disposal".

In some embodiments, the NuPlastiQ could be provided in a masterbatch formulation that may include the carbohydrate-based polymeric material as described above, the odor-reducing agent, and an amount of one or more compatibilizers. The masterbatch may also include one or more polymeric resins already included therein (e.g., the same polymeric resin with which the carbohydrate-based polymeric resin is to be blended with to form a target article). Such masterbatch formulation pellets could be mixed with pellets of the polymeric resin material at the time of processing. Any conceivable ratios may be used in mixing such different pellets, depending on the desired percentage of NuPlastiQ and/or compatibilizer and/or conventional polymeric resin in the finished article.

As noted above, the odor-reducing agent may typically be present in the carbohydrate-based polymeric material at a very low level, such as no more than 1%, no more than 0.1%, no more than 0.01%, no more than 1000 ppm, no more than 100 ppm, no more than 50 ppm, or no more than 20 ppm. Upon mixing the carbohydrate-based polymeric material including an odor-reducing agent with the polymeric resin, the level of odor-reducing agent in the resulting blended plastic article is reduced, depending on the mixing ratio of the carbohydrate-based polymeric material to the polymeric resin material. As noted herein, a wide variety of mixing ratios are suitable. By way of example, at a 1:1 mixing ratio, if the initial level of the odor-reducing agent in the carbohydrate-based polymeric material masterbatch is 20 ppm, it has now dropped to only 10 ppm, in the finished plastic article formed from the blend. At a mixing ratio of 25% of the carbohydrate-based polymeric material, and 75% of the polymeric resin material, an initial 20 ppm level for the odor-reducing agent has now dropped to 5 ppm.

It will be apparent that although the concentration of the odor-reducing agent has decreased, the ratio of the odor-reducing agent to the carbohydrate-based polymeric material remains unchanged due to such blending. For example, the weight ratio of odor-reducing agent to carbohydrate-based polymer may be from 1:1000, or even more dilute. For example the ratio may be 1:1000, 1:2000, 1:5000, 1:10,000, 1:15,000, 1:20,000, 1:25,000, 1:30,000, 1:35,000, 1:40,000, 1:45,000, 1:50,000, 1:60,000, 1:70,000, 1:80,000, 1:90,000, or 1:100,000. The ratio may be within a range between any such two values (e.g., 1:1000 to 1:100,000, or 1:10,000 to 1:80,000, or about 1:50,000). A level of 20 ppm for the odor-reducing agent in the carbohydrate-based polymeric material may be equivalent to a ratio of about 1:50,000. Even upon mixing with the polymeric resin material, this ratio may remain substantially constant as the addition of the polymeric resin material does not alter the amount of the odor-reducing agent or the carbohydrate-based polymeric material in the blend.

The NuPlastiQ materials described as suitable for use herein as the carbohydrate-based (e.g., starch-based) polymeric material are substantially amorphous. For example, raw starch powder (e.g., such as is used in making NuPlastiQ and various other thermoplastic starch materials) has approximately a 50% crystalline structure. NuPlastiQ materials available from BiologiQ differ from many other commercially available thermoplastic starch (TPS) materials in crystallinity versus amorphous characteristics. For example, p. 62-63 of "Thermoplastic Starch Composites and Blends" a PhD thesis by Kris Frost (September 2010) states "[o]f particular interest in TPS is completeness of gelatinisation during processing, and any subsequent tendency toward retrogradation to form V-type amylose crystals". Frost further continues "[g]elatinisation involves loss of granular and crystalline structures by heating with water and often including other plasticizers or modifying polymers. Retrogradation is due to the re-coiling of amylose helical coils. Starch molecules disrupted during gelatinisation slowly re-coil into their native helical arrangements or new single helical conformations known as V type, causing TPS films to rapidly become brittle and lose optical clarity". Thus, conventional TPS tends to re-form a crystalline structure after the gelatinization process used to produce the TPS from raw starch. On the contrary, the NuPlastiQ material available from BiologiQ does not revert back to a mostly crystalline structure. In addition, it can maintain a stable, relatively high degree of optical clarity, so as to be useful in forming relatively optically clear films (e.g., particularly by sandwiching NuPlastiQ containing layers between polyethylene or other polyolefin layers).

Figure 4:
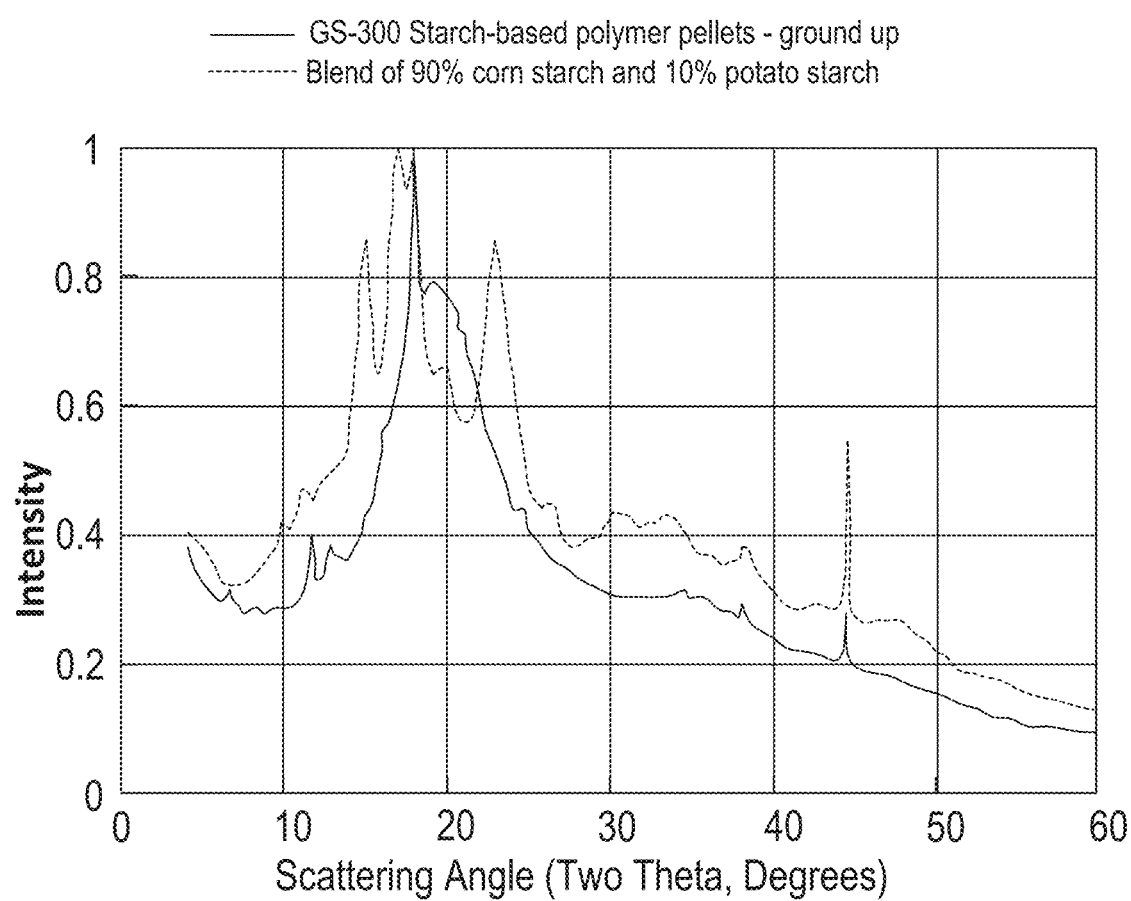
FIG. 4 shows X-ray diffraction patterns for an exemplary "NuPlastiQ" carbohydrate-based polymeric material commercially available from BiologiQ as compared to that of the blend of native corn starch and native potato starch used to form the NuPlastiQ.

In contrast to typical TPS materials, the NuPlastiQ materials that are suitable examples of starch-based polymeric materials for use in forming articles described in the present application have an amorphous microstructure, and physical characteristics as shown in Table 1. The difference in the molecular structure between conventional TPS and NuPlastiQ materials is evidenced by the NuPlastiQ materials as described herein being much less crystalline than conventional thermoplastic starch-based materials as shown by X-ray diffraction, shown in FIG. 4, comparing diffraction pattern results for NuPlastiQ material available from BiologiQ (sample 1) as compared to a blend of native raw corn starch and native raw potato starch, from which the NuPlastiQ in FIG. 4 was formed. The diffraction pattern of the NuPlastiQ as seen in FIG. 4 is much less crystalline (e.g., crystallinity of less than about 10%) than that of the native starch blend (crystallinity of about 50%). The difference in diffraction pattern evidences that a substantial chemical change has occurred in the material, due to processing from the native starches into E NuPlastiQ SR. For example, while there is a prominent diffraction peak between 20-25° with the native starch, no such peak is exhibited in the NuPlastiQ. The native starch further shows a strong peak at about 45° (at an intensity of 0.5 to 0.6), which peak is greatly reduced in the NuPlastiQ (only of about 0.25 to 0.3). Across nearly the entire spectrum, the diffraction intensities are higher for the native starches than for the NuPlastiQ, with the exception of from about 18° to about 22°, as shown. The elevated diffraction intensity seen across a wide spectrum is indicative of greater crystallinity of the native starches as compared to the NuPlastiQ. Numerous other differences also exist, as shown.

By way of example, the carbohydrate-based (e.g., starch-based) polymeric material used in making films or other articles according to the present disclosure may have a crystallinity of less than about 40%, less than about 35%, less than about 30%, less than about 25%, less than about 20%, less than about 15%, less than about 10%, less than about 8%, less than about 6%, less than about 5%, or less than about 3%. Any suitable test mechanism for determining crystallinity may be used, e.g., including but not limited to FTIR analysis, X-ray diffraction methods, and symmetrical reflection and transmission techniques. Various suitable test methods will be apparent to those of skill in the art.

In addition to the differences in the microstructure of the finished NuPlastiQ as compared to the starting materials, films, bottles, sheets, disposable utensils, plates, cups, or other articles produced from a blend including the carbohydrate-based polymeric material may be quite different from articles that are otherwise similar, but formed using conventional TPS and starch powder, or polymeric resins alone. For example, articles formed by blending the carbohydrate-based polymeric materials such as NuPlastiQ as described herein with a conventional polymeric resin material do not have "sea-island" features that are common when blending conventional TPS materials with polymeric materials such as polyethylene. Properties of the different films can be seen by comparing the physical properties of films as shown in Table 11 of Example 5 of Applicant's U.S. patent application Ser. No. 15/481,806, already incorporated by reference. In particular, this table compares the physical properties of films made by blending carbohydrate-based polymeric materials as contemplated herein with conventional polyethylene versus a conventional TPS blended with PE (Cardia BL-F). In addition to the differences in properties seen in Table 11 of Example 5 of Applicant's U.S. patent application Ser. No. 15/481,806, the film based on conventional TPS materials such as Cardia BL-F, blended with PE is not biodegradable, and not compostable.

As described herein, blending of the carbohydrate-based polymeric materials as described herein with a non-biodegradable polymeric resin material can result in not just the carbohydrate-based material being biodegradable, but the non-biodegradable polymeric resin material actually becoming biodegradable (even where the non-biodegradable polymeric resin material alone is not biodegradable). Such results do not occur when blending with typical TPS materials. Such differences in biodegradability clearly illustrate that there are significant structural and/or chemical differences in the resulting films and other articles, as the entire composite structure (i.e., the film or other structure) is now capable of being biodegraded.

Without being bound to any particular theory, it is believed that the carbohydrate-based polymeric resins may reduce the crystallinity of the blended products, interrupting the crystallinity and/or hygoscopic barrier characteristics of the polyethylene or other non-biodegradable polymeric resin material in a way that allows water and bacteria to degrade the arrangements and linkages of otherwise non-biodegradable polymeric resin molecules of the blend along with the carbohydrate-based polymeric resin material. In other words, the long polymer chains of polyethylene or other non-biodegradable polymeric resin material are more easily broken by chemical and mechanical forces that exist in environments that are rich in bacteria and microorganisms, when blended with carbohydrate-based polymeric materials as contemplated herein. Subsequently, the microorganisms that exist naturally in a disposal environment (e.g., in a landfill) can consume the remaining smaller molecules so that they are converted back into natural components (such as $CO_2$, $CH_4$, and $H_2O$). The addition of a small amount of an odor-reducing agent to the carbohydrate-based polymeric material does not alter these advantageous characteristics of the NuPlastiQ carbohydrate-based polymeric material.

In addition to biodegradability, the resulting blend may often have a higher elastic modulus (stiffness, or strength) than polyethylene or other non-biodegradable polymeric resin material, and can be used to make plastic films or other articles that are stronger than the same articles made with pure polyethylene or other pure non-biodegradable plastic material. Such increased strength and biodegradability characteristics are described in Applicant's applications already incorporated herein.

Returning to FIG. 1, at 106, the process 100 includes mixing the one or more polymeric resin materials the one or more carbohydrate-based polymeric materials, and the odor-reducing agent to produce a mixture of materials. In some cases, the mixing of the one or more polymeric resins and the one or more carbohydrate-based materials can be performed using one or more mixing devices. In a particular implementation, a mechanical mixing device can be used to mix the one or more polymeric resins and the one or more carbohydrate-based polymeric materials. In an implementation, at least a portion of the components of the mixture of the materials can be combined in an apparatus, such as an extruder, an injection molding machine, or the like. In other implementations, at least a portion of the components of the mixture of the materials can be combined before being fed into the apparatus. As described herein, the odor-reducing agent can be provided already dispersed within the carbohydrate-based polymeric material.

The one or more carbohydrate-based polymeric materials can be present in the mixture of materials an amount desired. By way of example, the carbohydrate-based polymeric material may be included in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, no greater than 99%, no greater than 95%, no greater than 90%, no greater than 80%, no greater than 70%, no greater than 60%, no greater than 50%, from 2% to 98%, from 20% to 40%, from 10% to 40%, from 20% to 30%, from 50% to 80%, or from 40% to 60% by weight of the mixture of materials. More than one carbohydrate-based polymeric material, and/or more than one other polymeric resin material may be included in the blend, if desired.

The polymeric resin can be present in the mixture of materials in an amount of at least 0.5%, at least 1%, at least 2%, at least 3%, at least 4%, at least 5%, at least 10%, at least 15%, at least 20%, at least 25%, at least 30%, at least 35%, at least 40%, at least 45%, at least 50%, no greater than 99%, no greater than 95%, no greater than 90%, no greater than 85%, no greater than 80%, no greater than 75%, no greater than 70%, no greater than 65%, or no greater than 60%, from 2% to 98%, from 50% to 90%, from 65% to 75%, from 20% to 50%, or from 40% to 60% by weight of the mixture of materials.

A compatibilizer may also be present in the mixture of materials. The compatibilizer can be mixed with the polymeric resin, the carbohydrate-based polymeric material, mixed with both, or provided separately. Often the compatibilizer may be provided with at least one of the polymeric materials, e.g., included in a masterbatch formulation, e.g., in the carbohydrate-based polymer with the odor-reducing agent. The compatibilizer can be a modified polyolefin or other modified plastic, such as a maleic anhydride grafted polypropylene, a maleic anhydride grafted polyethylene, a maleic anhydride grafted polybutene, or a combination thereof. The compatibilizer can also include an acrylate based co-polymer. For example, the compatibilizer can include an ethylene methyl acrylate co-polymer, an ethylene butyl-acrylate co-polymer, or an ethylene ethyl acrylate co-polymer. Additionally, the compatibilizer can include a poly(vinyacetate) based compatibilizer. In an embodiment, the compatibilizer may be a grafted version of the polymeric resin material (e.g., maleic anhydride grafted polyethylene where the polymeric resin material is polyethylene) or a copolymer (e.g., a block copolymer) where one of the blocks is of the same monomer as the polymeric resin material (e.g., a styrene copolymer where the polymeric resin material is polystyrene or ABS).

The mixture of materials may include at least 0.5%, at least 1%, at least 2%, at least 3%, at least 4%, at least 5%, no greater than 50%, no greater than 45%, no greater than 40%, no greater than 35%, no greater than 30%, no greater than 25%, no greater than 20%, no greater than 15%, no greater than 10%, no greater than 9%, no greater than 8%, no greater than 7%, no greater than 6%, from 0.5% by weight to 12%, from 2% to 7%, or from 4% to 6% by weight of a compatibilizer.

Although certainly not required, and in at least some embodiments the inclusion of such would be best avoided, it is within the scope of the present invention to include any of a variety of UV and OXO degradable additives, such as PDQ-M, PDQ-H, BDA, and OxoTerra™ from Willow Ridge Plastics, OX1014 from LifeLine, or organic additives such as Restore® by Enso, EcoPure® by Bio-Tec Environmental, ECM Masterbatch Pellets 1M by ECM Biofilms, or Biodegradable 201 and/or Biodegradable 302 BioSphere®. Other additives, for example, for increased strength (e.g., Biomax® Strong from Dupont), or otherwise may be included.

One or more such additives can be included in the mixture of materials in an amount of at least 0.5%, at least 1%, at least 1.5%, at least 2%, at least 2.5%, at least 3%, at least 4%, of no greater than 10%, no greater than 9%, no greater than 8%, no greater than 7%, no greater than 6%, no greater than 5%, from 0.2% to 12%, from 1% to 10%, from 0.5% to 4%, or from 2% by weight to 6% by weight of the mixture. Additional details regarding addition of such additives is found in Applicant's U.S. patent application Ser. No. 16/391,909, filed Apr. 23, 2019, herein incorporated by reference in its entirety.

While principally described in the context of a mixture of thermoplastic materials that can be melted together, to form a desired blend, in some embodiments, it may be possible to blend the carbohydrate-based polymeric material with a polymeric resin that is not thermoplastic (e.g., that is thermoset, e.g., such as for silicone). For example, the resin components that are precursors of such non-thermoplastic polymeric materials may be blended with the carbohydrate-based polymeric material, where polymerization or other formation of the non-thermoplastic material may occur in the presence of the carbohydrate-based polymeric material, resulting in a finished article that is a blend of the carbohydrate-based polymeric material and a thermoset or other non-thermoplastic plastic material. The inclusion of an odor-reducing agent in the blend may act to counter any characteristic odor of the carbohydrate-based polymeric material, as described herein.

Returning to FIG. 1, at 108, particularly where the materials are thermoplastic, the process 100 may include heating the mixture of materials. In an implementation, the mixture of materials can be heated to a temperature of at least 100° C., at least 110° C., at least 115° C., at least 120° C., at least 125° C., at least 130° C., at least 135° C., at least 140° C., no greater than 200° C., no greater than 190° C., no greater than 180° C., no greater than 175° C., no greater than 170° C., no greater than 165° C., no greater than 160° C., no greater than 155° C., no greater than 150° C., from 95° C. to 205° C., from 120° C. to 180° C., or from 125° C. to 165° C.

The mixture of materials including the polymeric resin, the carbohydrate-based polymeric material, and the odor-reducing agent can be heated in one or more chambers of an extruder. In some cases, one or more chambers of the extruder can be heated at different temperatures. The speed of one or more screws of the extruder can be any desired rate.

At 110, an article is produced using the mixture of materials. In some cases, the article can include a film. In other embodiments, the article can have a shape based on a design, such as a mold (e.g., injection molded). Any conceivable article formed of plastic may be formed from the mixture, e.g., including but not limited to films, bags, bottles, caps, lids, sheets, boxes, plates, cups, utensils, and the like. Where the article is a film, the film can be formed using a die by injecting a gas into the heated mixture of material to form the film (i.e., blowing the film). Films can be sealed and/or otherwise modified to be in the form of a bag or other article.

Where the article is a film, the film can be comprised of a single layer or multiple layers. The film or any individual layers can have a thickness of at least 0.001 mm, at least 0.002 mm, at least 0.004 mm, at least 0.01 mm, at least 0.02 mm, at least 0.03 mm, at least 0.05 mm, at least 0.07 mm, at least 0.10 mm, no greater than 2 mm, no greater than 1 mm, no greater than 0.5 mm, no greater than 0.1 mm, from about 0.05 mm to about 0.5 mm, or from 0.02 mm to 0.05 mm. While there may be some overlap in thickness values for film and sheet articles, it will be appreciated that sheet materials of greater thickness than such film values may of course be provided, produced by any desired plastic manufacturing process.

Films or other articles can have strength characteristics that are characterized through testing, such as a dart drop impact test (ASTM D-1709), tensile strength at break test (ASTM D-882), tensile elongation at break test (ASTM D-882), a secant modulus test (ASTM D-882), and/or an Elmendorf Tear test (ASTM D-1922). Strength and other physical property characteristics, as well as biodegradability characteristics for such films and other articles are described in more detail in Applicant's other applications, already incorporated by reference.

Figure 2:
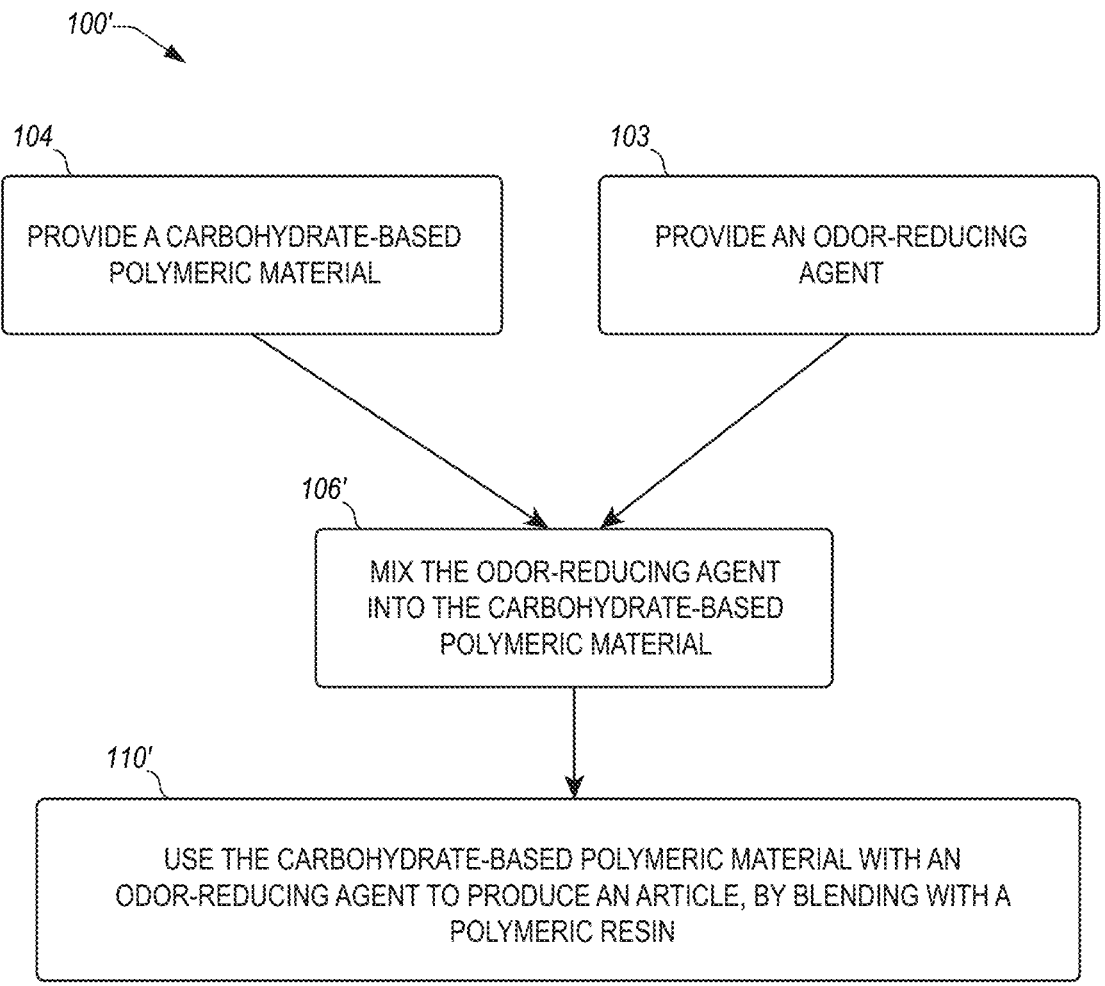
FIG. 2 illustrates a flow diagram of an example process for forming a carbohydrate-based polymeric material that includes an odor-reducing agent that counteracts a characteristic odor of the carbohydrate-based polymeric material, and then using the carbohydrate-based polymeric material with odor-reducing agent to produce an article.

While FIG. 1 illustrates how an article may be produced from a polymeric resin (at 102), an odor-reducing agent (at 103), and a carbohydrate-based polymeric material (at 104), FIG. 2 illustrates a process 100' by which the odor-reducing agent may be incorporated into the carbohydrate-based polymeric material. For example, the odor-reducing agent may be provided at 103, the carbohydrate-based polymeric material is provided at 104, and they are mixed together at 106'. By way of example, this may occur where the organic odor-reducing agent is mixed into the carbohydrate-based polymeric material when formulating a masterbatch (e.g., where the odor-reducing agent is added to the carbohydrate-based polymeric material when also adding a compatibilizer or other components to be included in the masterbatch). In another embodiment, the odor-reducing agent may be mixed with the starting material(s) from which the carbohydrate-based polymeric material is formed (e.g., by mixing the odor-reducing agent into one or more of the water, glycerin, or starch components, from which the carbohydrate-based polymeric material is formed). In any case, the selected method results in a carbohydrate-based polymeric material that includes the odor-reducing agent dispersed therein. The concentration thereof may be very low (e.g., 20 ppm), as described herein. At 110', such a carbohydrate-based polymeric material (including the odor-reducing agent) may be used to produce an article, by blending with a polymeric resin (e.g., typically involving application of heat, to melt and blend the thermoplastic materials together).

Figure 3:
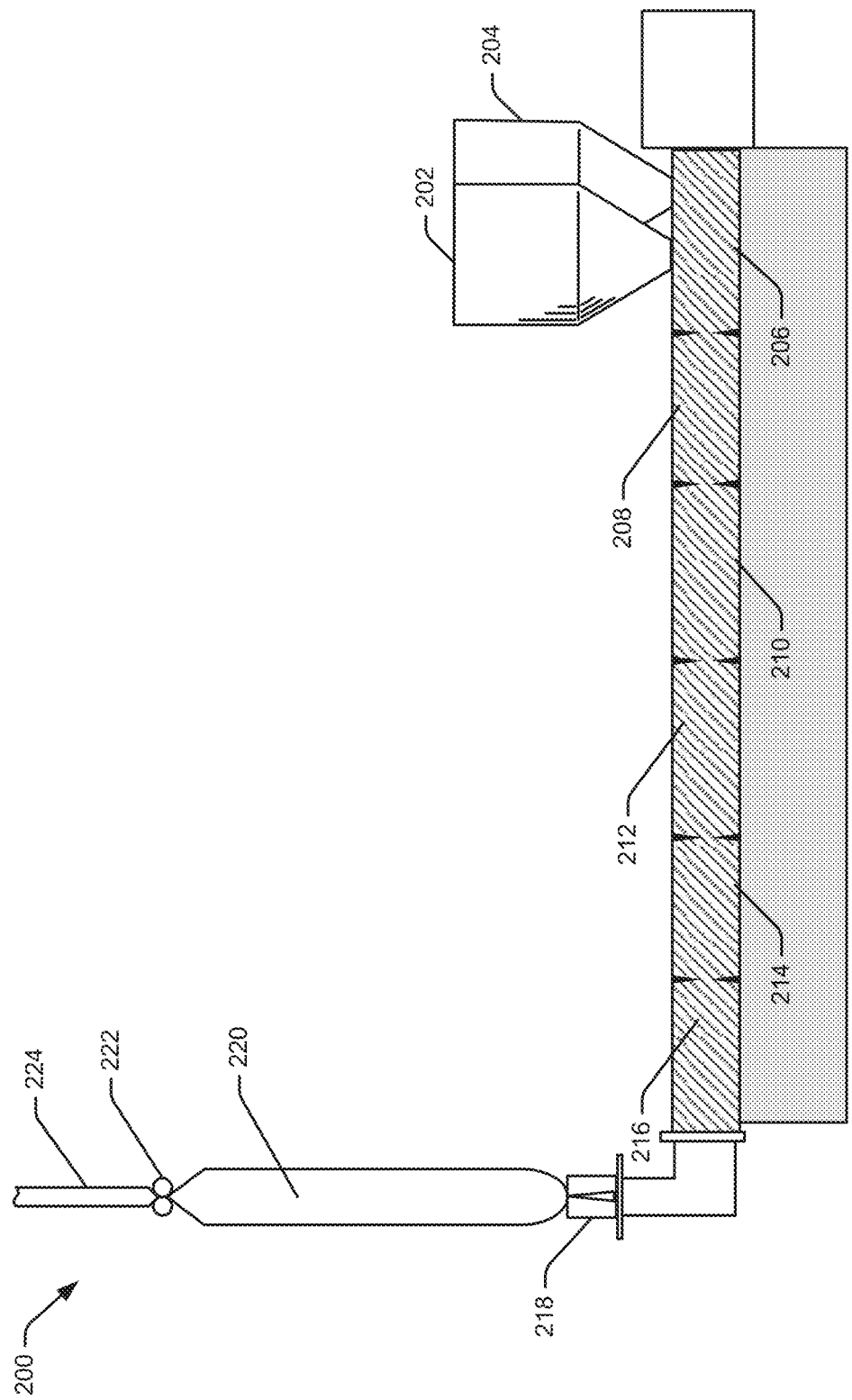
FIG. 3 illustrates components of an example manufacturing system to produce articles from a polymeric resin, a carbohydrate-based polymeric material, and an odor-reducing agent.

FIG. 3 illustrates components of an example manufacturing system 200 to produce articles according to the present disclosure. In some cases, the manufacturing system 200 can be used in the process 100 or 100' of FIGS. 1-2. In an illustrative example, the manufacturing system 200 is an extruder, such as a single screw extruder or a twin screw extruder.

In an implementation, one or more polymeric resins and one or more carbohydrate-based polymeric materials are provided via a first hopper 202 and a second hopper 204. The odor-reducing agent may be included with either or both materials (e.g., preferably with the carbohydrate-based polymeric material). A compatibilizer may be included with either or both materials (e.g., in a masterbatch thereof).

The one or more carbohydrate-based polymeric materials, the one or more polymeric resins, and the odor-reducing agent can be mixed in a first chamber 206 to produce a mixture of materials. In some cases, the mixture of materials can include from 5% by weight to 40% by weight of the one or more carbohydrate-based polymeric materials, from 60% by weight to 94% by weight of the one or more polymeric resins, from 1% by weight to 9% by weight of the one or more compatibilizers, and less than 1%, less than 0.1%, less than 1000 ppm, (e.g., from 1 ppm to 100 ppm) of the odor-reducing agent. The ranges of course may be varied outside the above ranges, depending on desired characteristics.

In the example implementation shown in FIG. 3, the mixture of materials can pass through a number of chambers, such as the first chamber 206, a second chamber 208, a third chamber 210, a fourth chamber 212, a fifth chamber 214, and an optional sixth chamber 216. The mixture of materials can be heated in the chambers 206, 208, 210, 212, 214, 216. In some cases, a temperature of one of the chambers can be different from a temperature of another one of the chambers. In an illustrative example, the first chamber 206 is heated to a temperature from 120° C. to 140° C.; the second chamber 208 is heated to a temperature from 130° C. to 160° C.; the third chamber 210 is heated to a temperature from 135° C. to 165° C.; the fourth chamber 212 is heated to a temperature from 140° C. to 170° C.; the fifth chamber 214 is heated to a temperature from 145° C. to 180° C.; and the optional sixth chamber 216 is heated to a temperature from 145° C. to 180° C.

The heated mixture can then be extruded using a die 218 to form an extruded object, such as a film, sheet, or the like. Injection molding, thermoforming, or other plastic production processes may be used to manufacture various articles such as utensils, plates, cups, bottles, caps or lids therefore, or the like. In film blowing, a gas can be injected into the extruded object to expand it with a pressure from 105 bar to 140 bar. The resulting tube 220 can be drawn up through rollers 222 to create a film 224 with a thickness typically from 0.02 mm (about 0.8 mil) to 0.05 mm (about 2 mil). Even thinner films can be made using the blends as described herein, e.g., having a thickness as little as 0.1 mil (0.0025 mm). Of course, thicknesses greater than 2 mil can also be achieved. In some cases, the film 224 can be comprised of a single layer. In other cases, the film 224 can be comprised of multiple layers. Where multiple layers are present, at least one of the layers may include the carbohydrate-based polymeric material, and the odor-reducing agent. In some embodiments, the carbohydrate-based polymeric material and the odor-reducing agent may be present in one or more outer layers. In another embodiment, the carbohydrate-based polymeric material and odor-reducing agent may be present in an inner layer.

The concepts described herein will be further described in the following examples.

EXAMPLES

Example 1

Example 1 is a comparative example. Samples are prepared from a blend of a carbohydrate-based polymeric material and another polymeric resin (selected as polyethylene), as well as a maleic anhydride modified PE compatibilizer. The compatibilizer is included in an amount of 5% by weight. The amount of the carbohydrate-based polymeric material is varied from 5% up to 50% by weight, with the balance being the polyethylene polymeric resin. These samples do not include any odor-reducing agent, and exhibit a slight odor characteristic of the carbohydrate-based polymeric material, which may be described as a popcorn-like odor, caramel corn like odor, or slightly burned starch odor. While the odor is nearly unobservable when the geometry of the article is relatively open (e.g., a planar sheet or film of the material), the odor becomes more pronounced where the geometry is relatively closed (e.g., in the form of a cup, or where the film is wound on a roll).

Example 2

Samples are prepared that are identical to those of Example 1, but which include a small fraction of 4-hydroxy-3-methoxybenzaldehyde (vanillin) therein as an odor-reducing agent. The odor-reducing agent is provided as a powder, e.g., as a freeze-dried powder. The powder is mixed with the liquid components used to make the carbohydrate-based polymeric material (e.g., water and/or glycerin) to obtain homogenous dispersion of the odor-reducing agent therein. The carbohydrate-based polymeric material is thereafter formed from the water, glycerin, and starches in the same manner as Example 1, so that the finished carbohydrate-based polymeric material includes the odor-reducing agent dispersed therein at a level of 20 ppm (0.002%) by weight. In each sample, the ratio of the carbohydrate-based polymeric material to odor-reducing agent (NuPlastiQ to ORA ratio) is 50,000:1.

Characteristics for the samples are as shown in Table 2.

TABLE 2

| | Sample A | Sample B | Sample C | Sample D | Sample E | Sample F | Sample G |
|---|---|---|---|---|---|---|---|
| Carbohydrate-Based Polymeric Material | 5% | 10% | 20% | 25% | 30% | 40% | 50% |

TABLE 2-continued

|  | Sample A | Sample B | Sample C | Sample D | Sample E | Sample F | Sample G |
|---|---|---|---|---|---|---|---|
| Polyethylene | 90% | 85% | 75% | 70% | 65% | 55% | 45% |
| Compatibilizer | 5% | 5% | 5% | 5% | 5% | 5% | 5% |
| Odor-Reducing Agent in Blend | 1 ppm | 2 ppm | 4 ppm | 5 ppm | 6 ppm | 8 ppm | 10 ppm |
| Ratio of NuPlastiQ to ORA | 50,000:1 | 50,000:1 | 50,000:1 | 50,000:1 | 50,000:1 | 50,000:1 | 50,000:1 |

In contrast to the otherwise identical samples of Example 1, these samples no longer exhibit the slight characteristic odor described in Example 1. The difference in odor is particularly apparent with relatively closed non-planar geometries, such as where the blend is shaped into the form of a cup. By way of comparison, cups formed from such blends as shown in Table 2 exhibit no discernable odor, similar to cups formed from 100% polyethylene. It is surprising that so little of the odor-reducing agent is sufficient to counteract the otherwise characteristic odor typically associated with carbohydrate-based polymeric content.

Example 3

Samples are prepared that are identical to those of Example 1, but which include a small fraction of freeze-dried strawberry powder therein as an odor-reducing agent. The powdered odor-reducing agent is dispersed in the carbohydrate-based polymeric material at a level of 20 ppm (0.002%) by weight.

Articles are formed in the same manner as in Example 1, but include a small fraction of the odor-reducing agent dispersed therein.

TABLE 3

|  | Sample A | Sample B | Sample C | Sample D | Sample E | Sample F | Sample G |
|---|---|---|---|---|---|---|---|
| Carbohydrate-Based Polymeric Material | 5% | 10% | 20% | 25% | 30% | 40% | 50% |
| Polyethylene | 90% | 85% | 75% | 70% | 65% | 55% | 45% |
| Compatibilizer | 5% | 5% | 5% | 5% | 5% | 5% | 5% |
| Odor-Reducing Agent in Blend | 1 ppm | 2 ppm | 4 ppm | 5 ppm | 6 ppm | 8 ppm | 10 ppm |
| Ratio of NuPlastiQ to ORA | 50,000:1 | 50,000:1 | 50,000:1 | 50,000:1 | 50,000:1 | 50,000:1 | 50,000:1 |

In contrast to the otherwise identical samples of Example 1, these samples no longer exhibit the slight characteristic odor described in Example 1. The difference in odor is particularly apparent with relatively closed non-planar geometries, such as where the blend is shaped into the form of a cup. By way of comparison, cups formed from such blends as shown in Table 3 exhibit no discernable odor, similar to cups formed from 100% polyethylene. It is surprising that so little of the odor-reducing agent is sufficient to counteract the otherwise characteristic odor typically associated with carbohydrate-based polymeric content.

Example 4

Samples are prepared that are identical to those of Example 1, but which include a small fraction of freeze-dried blueberry powder therein as an odor-reducing agent. The powdered odor-reducing agent is dispersed in the carbohydrate-based polymeric material at a level of 20 ppm (0.002%) by weight.

Articles are formed in the same manner as in Example 1, but include a small fraction of the odor-reducing agent dispersed therein.

TABLE 4

|  | Sample A | Sample B | Sample C | Sample D | Sample E | Sample F | Sample G |
|---|---|---|---|---|---|---|---|
| Carbohydrate-Based Polymeric Material | 5% | 10% | 20% | 25% | 30% | 40% | 50% |
| Polyethylene | 90% | 85% | 75% | 70% | 65% | 55% | 45% |
| Compatibilizer | 5% | 5% | 5% | 5% | 5% | 5% | 5% |
| Odor-Reducing Agent in Blend | 1 ppm | 2 ppm | 4 ppm | 5 ppm | 6 ppm | 8 ppm | 10 ppm |
| Ratio of NuPlastiQ to ORA | 50,000:1 | 50,000:1 | 50,000:1 | 50,000:1 | 50,000:1 | 50,000:1 | 50,000:1 |

In contrast to the otherwise identical samples of Example 1, these samples no longer exhibit the slight characteristic odor described in Example 1. The difference in odor is particularly apparent with relatively closed non-planar geometries, such as where the blend is shaped into the form of a cup. By way of comparison, cups formed from such blends as shown in Table 4 exhibit no discernable odor, similar to cups formed from 100% polyethylene. It is surprising that so little of the odor-reducing agent is sufficient to counteract the otherwise characteristic odor typically associated with carbohydrate-based polymeric content.

Example 5

Samples are prepared in a similar manner as in Example 1, but which include varying small fractions of freeze-dried vanillin powder therein as an odor-reducing agent. The powdered odor-reducing agent is dispersed in the carbohydrate-based polymeric material at levels from 5 ppm (0.0005%) to 100 ppm (0.01%) by weight.

Articles are formed in the same manner as in Example 1, but include a small fraction of the odor-reducing agent dispersed therein.

TABLE 5

|  | Sample A | Sample B | Sample C | Sample D | Sample E | Sample F |
|---|---|---|---|---|---|---|
| Carbohydrate-Based Polymeric Material | 25% | 25% | 25% | 25% | 25% | 25% |
| Polyethylene | 70% | 70% | 70% | 70% | 70% | 70% |
| Compatibilizer | 5% | 5% | 5% | 5% | 5% | 5% |
| Odor-Reducing Agent in NuPlastiQ | 5 ppm | 10 ppm | 30 ppm | 50 ppm | 75 ppm | 100 ppm |
| Odor-Reducing Agent in Blend | 1 ppm | 2 ppm | 4 ppm | 6 ppm | 8 ppm | 10 ppm |
| Ratio of NuPlastiQ to ORA | 50,000:1 | 25,000:1 | 8,333:1 | 5,000:1 | 3,333:1 | 2,500:1 |

In contrast to the otherwise identical samples of Example 1, these samples no longer exhibit the slight characteristic odor described in Example 1. The difference in odor is particularly apparent with relatively closed non-planar geometries, such as where the blend is shaped into the form of a cup. By way of comparison, cups formed from such blends as shown in Table 5 exhibit no discernable odor, similar to cups formed from 100% polyethylene. It is surprising that so little of the odor-reducing agent is sufficient to counteract the otherwise characteristic odor typically associated with carbohydrate-based polymeric content. The relatively higher levels of vanillin (e.g., 100 ppm and higher) may begin to include a characteristic pleasant vanilla odor.

It is to be understood that the embodiments of the inventive features disclosed herein are illustrative of the principles of the inventive features. Other modifications that may be employed are within the scope of the inventive features. Thus, by way of example, but not of limitation, alternative configurations of the inventive features may be utilized in accordance with the teachings herein. Accordingly, the inventive features are not limited to that precisely as shown and described.

The invention claimed is:

1. A sustainable plastic material exhibiting reduced odor comprising:
   a polymeric resin;
   an organic odor-reducing agent;
   a carbohydrate-based polymeric material, wherein in the absence of the organic odor-reducing agent, the carbohydrate-based polymeric material would lend a characteristic burned carbohydrate odor to the sustainable plastic material; and
   wherein the organic odor-reducing agent comprises more than 0% but no more than 0.1% of the plastic material.

2. The material of claim 1, wherein the organic odor-reducing agent comprises a freeze-dried powder.

3. The material of claim 1, wherein the organic odor-reducing agent comprises a vanilla extract.

4. The material of claim 1, wherein the organic odor-reducing agent comprises vanillin.

5. The material of claim 1, wherein the organic odor-reducing agent has the following chemical structure:

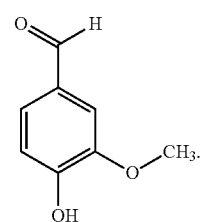 [SMILES: COc1cc(C=O)ccc1O]

6. The material of claim 1, wherein the organic odor-reducing agent consists essentially of 4-hydroxy-3-methoxybenzaldehyde.

7. The material of claim 1, wherein the organic odor-reducing agent comprises more than 0% but no more than 0.01% of the plastic material.

8. The material of claim 1, wherein the organic odor-reducing agent comprises more than 0 ppm but no more than 100 ppm of the plastic material.

9. The material of claim 1, wherein the organic odor-reducing agent comprises more than 0 ppm but no more than 50 ppm of the plastic material.

10. The material of claim 1, wherein the organic odor-reducing agent comprises more than 0 ppm but no more than 20 ppm of the plastic material.

11. The material of claim 1, wherein the organic odor-reducing agent is present at a weight ratio relative to the carbohydrate-based polymeric material of from 1:1000 to 1:100,000.

12. The material of claim 1, wherein the organic odor-reducing agent is present at a weight ratio relative to the carbohydrate-based polymeric material of from 1:25,000 to 1:75,000.

13. The material of claim 1, wherein tyre organic odor-reducing agent comprises a fruit extract.

14. The material of claim 13, wherein the organic odor-reducing agent comprises a freeze dried organic fruit extract selected from extracts of vanilla, strawberry, blueberry, banana, apple, peach, pear, kiwi, mango, passionfruit, raspberry or a combination thereof.

15. The material of claim 13, wherein the freeze dried organic fruit extract is present in the plastic material at a weight ratio of no more than 1:1000 relative to the carbohydrate-based polymeric material.

16. The material of claim 1, wherein the carbohydrate-based polymeric material is a starch-based polymeric material.

17. A sustainable plastic material exhibiting reduced odor comprising:
   a polymeric sin;
   an organic odor-reducing agent;
   a carbohydrate-based polymeric material, wherein in the absence of the organic odor-reducing agent, the carbohydrate-based polymeric material would lend a characteristic burned carbohydrate odor to the sustainable plastic material; and
   wherein the carbohydrate-based polymeric material has a crystallinity of less than about 20%, and resists recrystallization, and a water content of no more than about 2%.

18. The material of claim 17, wherein the carbohydrate-based polymeric material and the polymeric resin exhibit a substantial lack of sea-island features when blended together to form the sustainable plastic material.

19. The material of claim 17, wherein the carbohydrate-based polymeric material has a water content of no more than about 1.5%.

20. The material of claim 17, wherein the polymeric resin comprises from 60-99% by weight of the sustainable plastic material, and the carbohydrate-based polymeric material comprises from 0.5-40% by weight of the sustainable plastic material.

* * * * *